(12) United States Patent
Leskovec et al.

(10) Patent No.: US 11,227,014 B2
(45) Date of Patent: Jan. 18, 2022

(54) GENERATING NEIGHBORHOOD CONVOLUTIONS ACCORDING TO RELATIVE IMPORTANCE

(71) Applicant: Pinterest, Inc., San Francisco, CA (US)

(72) Inventors: Jurij Leskovec, Stanford, CA (US); Chantat Eksombatchai, Redwood City, CA (US); Kaifeng Chen, San Mateo, CA (US); Ruining He, Davis, CA (US); Rex Ying, Stanford, CA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 16/273,969

(22) Filed: Feb. 12, 2019

(65) Prior Publication Data

US 2019/0286659 A1    Sep. 19, 2019

Related U.S. Application Data

(60) Provisional application No. 62/642,527, filed on Mar. 13, 2018.

(51) Int. Cl.
*G06F 16/901* (2019.01)
*G06F 16/906* (2019.01)
(Continued)

(52) U.S. Cl.
CPC ........ *G06F 16/9024* (2019.01); *G06F 16/182* (2019.01); *G06F 16/2272* (2019.01);
(Continued)

(58) Field of Classification Search
CPC .............. G06F 16/182; G06F 16/9024; G06F 16/9027; G06F 16/9035; G06F 16/906;
(Continued)

(56) References Cited

U.S. PATENT DOCUMENTS 9,177,225 B1    11/2015  Cordova-Diba et al.
9,419,854 B1    8/2016   Wang et al.
(Continued)

FOREIGN PATENT DOCUMENTS

WO    2017168125 A1    10/2017

OTHER PUBLICATIONS

Chandra Bhagavatula et al., "Content Based Citation Recommendation", ARXIV.org, Cornell University Library, 201 Olin Library, Cornell University, Ithaca, NY 14853, Feb. 22, 2018.
(Continued)

*Primary Examiner* — Phong H Nguyen
(74) *Attorney, Agent, or Firm* — Althorus, PLLC

(57) ABSTRACT

Systems and methods for generating embeddings for nodes of a corpus graph are presented. More particularly, embedding information of a target node may be based on the node itself, as well as related, relevant nodes to the target node within a corpus graph. The information of various nodes among the relevant nodes to the target node can be used to weight or influence the embedding information. Disclosed systems and methods include generating neighborhood embedding information for a target node, where the neighborhood embedding information includes embedding information from neighborhood nodes of the target node's relevant neighborhood, and where certain nodes having more relevance to the target node can be weighted to influence the generation of the neighborhood embedding information over nodes having less relevance to the target node.

20 Claims, 17 Drawing Sheets

(51) Int. Cl.
*G06K 9/62* (2006.01)
*G06F 16/9536* (2019.01)
*G06F 16/9535* (2019.01)
*G06N 3/04* (2006.01)
*G06K 9/68* (2006.01)
*G06F 16/51* (2019.01)
*G06N 20/00* (2019.01)
*G06F 16/22* (2019.01)
*G06N 3/08* (2006.01)
*G06F 16/182* (2019.01)
*G06F 16/9035* (2019.01)
*G06F 9/38* (2018.01)

(52) U.S. Cl.
CPC ............ *G06F 16/51* (2019.01); *G06F 16/906* (2019.01); *G06F 16/9035* (2019.01); *G06F 16/9535* (2019.01); *G06F 16/9536* (2019.01); *G06K 9/6228* (2013.01); *G06K 9/6257* (2013.01); *G06K 9/6276* (2013.01); *G06K 9/6892* (2013.01); *G06N 3/04* (2013.01); *G06N 3/08* (2013.01); *G06N 20/00* (2019.01); *G06F 9/3877* (2013.01)

(58) Field of Classification Search
CPC ............... G06F 16/51; G06F 16/24537; G06F 16/9535; G06F 16/2272; G06F 16/9536; G06F 16/00; G06F 17/00; G06F 9/3877; G06K 9/6892; G06K 9/627; G06K 9/6296; G06K 9/6262; G06K 9/6257; G06K 9/6276; G06K 9/6228; G06K 9/6256; G06Q 30/02; G06N 5/04; G06N 3/04; G06N 3/08; G06N 20/00; G06N 7/005; G06N 3/0454
USPC ........................................ 707/748, 797, 798
See application file for complete search history.

(56) References Cited

U.S. PATENT DOCUMENTS

| | | | |
|---|---|---|---|
| 9,558,265 B1* | 1/2017 | Tacchi | G06N 5/022 |
| 9,710,544 B1* | 7/2017 | Smith | G06F 16/36 |
| 10,671,672 B1* | 6/2020 | Eksombatchai | G06F 16/9024 |
| 10,860,924 B2 | 12/2020 | Burger | |
| 2003/0014735 A1* | 1/2003 | Achlioptas | G06F 11/3688 717/125 |
| 2004/0208562 A1 | 10/2004 | Ufongene | |
| 2006/0122998 A1 | 6/2006 | Bar-Yossef et al. | |
| 2006/0184464 A1* | 8/2006 | Tseng | G06F 16/313 706/14 |
| 2008/0275861 A1* | 11/2008 | Baluja | G06N 5/02 707/999.005 |
| 2010/0228731 A1* | 9/2010 | Gollapudi | G06F 16/955 707/737 |
| 2010/0241647 A1* | 9/2010 | Ntoulas | G06F 16/24575 707/765 |
| 2010/0262576 A1 | 10/2010 | Stockwell et al. | |
| 2011/0145261 A1* | 6/2011 | Jamjoom | G06F 16/9024 707/748 |
| 2011/0264649 A1 | 10/2011 | Hsiao et al. | |
| 2012/0330864 A1* | 12/2012 | Chakrabarti | G06F 16/951 706/10 |
| 2013/0275429 A1 | 10/2013 | York et al. | |
| 2014/0324864 A1 | 10/2014 | Choe et al. | |
| 2014/0354649 A1 | 12/2014 | Aksu et al. | |
| 2015/0146603 A1 | 5/2015 | Wu et al. | |
| 2016/0070817 A1* | 3/2016 | Aggarwal | G06F 16/24568 707/798 |
| 2017/0046520 A1 | 2/2017 | Ohrimenko et al. | |
| 2017/0278135 A1 | 9/2017 | Majumdar et al. | |
| 2017/0364450 A1 | 12/2017 | Struttmann | |
| 2018/0103052 A1 | 4/2018 | Choudhury et al. | |
| 2018/0336457 A1 | 11/2018 | Pal et al. | |
| 2018/0336472 A1 | 11/2018 | Ravi | |
| 2018/0373701 A1* | 12/2018 | McAteer | G06F 16/9024 |
| 2019/0005400 A1* | 1/2019 | Liu | G06N 5/048 |
| 2019/0026697 A1 | 1/2019 | Burton et al. | |
| 2019/0057303 A1 | 2/2019 | Burger | |
| 2019/0089720 A1 | 3/2019 | Aditham et al. | |
| 2019/0095806 A1* | 3/2019 | Martinez Canedo | G06F 16/9024 |
| 2019/0114362 A1* | 4/2019 | Subbian | G06F 16/24578 |
| 2019/0114373 A1* | 4/2019 | Subbian | G06F 16/951 |

OTHER PUBLICATIONS

International Search Report and Written Opinion for International Application No. PCT/US2019/021932, dated Jun. 14, 2019.
Omar M. Parkhi et al., "Deep Face Recognition", Proceedings of the British Machine Vision Conference, Jan. 1, 2015, pp. 41.1-41.12.
Xiaofan Zhang et al., "Embedded Label Structures for Fine-Grained Feature Representation", 2016 IEEE Conference on Computer Vision and Pattern Recognition (CVPR), IEEE, Jun. 27, 2016, pp. 1114-1123, [retrieved Dec. 9, 2016].
Abadi, M. et al., "Tensorflow: Large-Scale Machine Learning on Heterogeneous Distributed Systems," arXiv preprint arXiv: 1603 04467, Mar. 16, 2016, 19 pages.
Andoni, A. and Indyk, P., "Near-Optimal Hashing Algorithms for Approximate Nearest Neighbor in High Dimensions," FOCS, 2006, 6 pages.
Bansal et al., "Ask the GRU: Multi-Task Learning for Deep Text Recommendations," ReeSys. ACM, Sep. 9, 2016, 8 pages.
Bengio et al., "Curriculum Learning," ICML, 2009, 8 pages.
Broder et al., "Efficient Query Evaluation Using a Two-Level Retrieval Process," CIKM, 2003, 9 pages.
Bronstein et al., "Geometric Deep Learning: Going Beyond Euclidean Data," IEEE Signal Processing Magazine, vol. 34(4), 2017, 25 pages.
Bruna et al., "Spectral Networks and Deep Locally Connected Networks on Graphs," ICLR, 2014, 14 pages.
Chen et al., "FastGCN: Fast Learning with Graph Convolutional Networks via Importance Sampling," In ICLR, 2018, 15 pages.
Covington et al., "Deep Neural Networks for YouTube Recommendations," RecSys. ACM, 2016, 8 pages.
Dai et al., "Discriminative Embeddings of Latent Variable Models for Structured Data," ICML, 2016, 10 pages.
Defferrard et al., "Convolutional Neural Networks on Graphs with Fast Localized Spectral Filtering," NIPS, 2016, 9 pages.
Duvenaud et al., "Convolutional Networks on Graphs for Learning Molecular Fingerprints," NIPS, 2015, 9 pages.
Eksombatchai et al., "Pixie: A System for Recommending 3+ Billion Items to 200+ Million Users in Real-Time," arXiv preprint arXiv:1711.07601, 2017, 10 pages.
Gori et al., "A New Model for Learning in Graph Domains," IEEE International Joint Conference on Neural Networks, 2005, 6 pages.
Goyal et al., "Accurate, Large Minibatch SGD: Training ImageNet in 1 Hour," arXiv preprint arXiv:1706.02677,2017, 12 pages.
Grover, A. and Leskovec, J., "node2vec: Scalable Feature Learning for Networks," KDD, 2016, 10 pages.
Hamilton et al., "Inductive Representation Learning on Large Graphs," NIPS, 2017, 19 pages.
Hamilton et al., "Representation Learning on Graphs: Methods and Applications," IEEE Data Engineering Bulletin, 2017, 23 pages.
Kearnes et al., "Molecular Graph Convolutions: Moving Beyond Fingerprints," CAMD, vol. 30, Issue 8, 2016, 25 pages.
Kipf, T.N. and Welling, M., "Semi-Supervised Classification with Graph Convolutional Networks," ICLR, 2017, 14 pages.
Li et al., "Gated Graph Sequence Neural Networks," ICLR, 2015, 19 pages.
Mikolov et al., "Distributed Representations of Words and Phrases and Their Compositionality," NIPS, 2013, 9 pages.
Monti et al., "Geometric Matrix Completion with Recurrent Multi-Graph Neural Networks," NIPS, 2017, 9 pages.
OpenMP Architecture Review Board, OpenMP Application Programming Interface Version 4.5., 2015, 368 pages.

(56) References Cited

OTHER PUBLICATIONS

Perozzi et al., "DeepWalk: Online Learning of Social Representations," KDD, 2014, 10 pages.
Scarselli et al., "The Graph Neural Network Model," IEEE Transactions on Neural Networks vol. 20, No. 1, 2009, pp. 61-80.
Simonyan, K. and Zisserman, A., "Very Deep Convolutional Networks For Large-Scale Image Recognition," arXiv preprint arXiv:1409.1556, 2014, 13 pages.
Van den Berg et al., "Graph Convolutional Matrix Completion," arXiv preprint arXiv: 1706.02263,2017, 9 pages.
Van den Oord, A., Dieleman, S., and Schrauwen, B., "Deep Content-Based Music Recommendation," NIPS, 2013, 9 pages.

* cited by examiner

RN(J) = {G, H, I, L, P}

RN(G) = {E, J, Q, S}

RN(H) = {D, F, I}

$RN(I) = \{D, F, H, J, L\}$ $RN(L) = \{H, I, J, N, P, U\}$ $RN(P) = \{A, B, L, U\}$

GENERATING NEIGHBORHOOD CONVOLUTIONS ACCORDING TO RELATIVE IMPORTANCE

CROSS-REFERENCE TO RELATED MATTER

This application claims priority to U.S. Provisional Patent Application No. 62/642,527, titled "GRAPH CONVOLUTIONAL NEURAL NETWORKS FOR WEB-SCALE RECOMMENDER SYSTEMS," filed Mar. 13, 2018, which is incorporated by reference.

BACKGROUND

Recommender systems are typically online, network-accessible systems or services that make recommendations of content to a user/person in response to user interactions and queries. Generally speaking, recommended content is viewed as being similar, relevant and/or complimentary to the subject matter of a user query to the online service. For example, the online service Pinterest® allows its users to "pin" content to the user's "pin boards." Pinning the content to a board, typically considered as a user interaction, is also viewed as a "query." In response to this query, the Pinterest recommender system suggests additional pins/content to the user that are viewed as being similar, relevant and/or complimentary, and presumably desirable to the user's pin or contents of the target pin board.

In many instances, in order to make a recommendation of content, recommender systems perform numerous analyses on a large corpus of items and data to determine what other content in the corpus of items is likely similar, complimentary, relevant and/or desirable to that computer user for that particular item query. More and more, these analyses are conducted and/or implemented through deep neural networks. Often, these analyses are based on embedding vectors (also referred to as feature vectors) or other items of content that are known to the service. Each embedding vector represents various aspects of the corresponding item of content. Generally speaking, by comparing an embedding vector of a "query" to the embedding vectors of other items of known content, the recommender service is able to provide similar and/or complimentary content.

When the body of known content becomes large, simply comparing elements of embedding vectors of a large corpus of items against the embedding vector of the query item is impractical. For example, Pinterest's corpus of content includes billions of pins with 10's of billions of connections among the pins. Comparing an embedding vector of a query item against embedding vectors of billions of other items of content is simply infeasible. Moreover, the problem of scale (how to recommend highly relevant content from a corpus of billions of items) is further exacerbated as the corpus of items is constantly evolving and growing, as is the case when hundreds of millions of users are posting or pinning items of content and establishing relationships between items of content in the corpus graph on a daily, and/or hourly, basis.

Incorporating relevant neighborhood information of an item of content into an aggregated embedding vector for that item can lead to improved recommendations for a recommender system. However, identifying a relevant neighborhood within a corpus graph of content for a given node, subsequently determining embedding information from the item's neighbors, and then combining the neighborhood embedding information into an aggregated embedding vector for that given node can take significant processing resources. Doing so in an "on demand" manner places greater emphasis and importance on conducting these processes as efficiently as possible.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
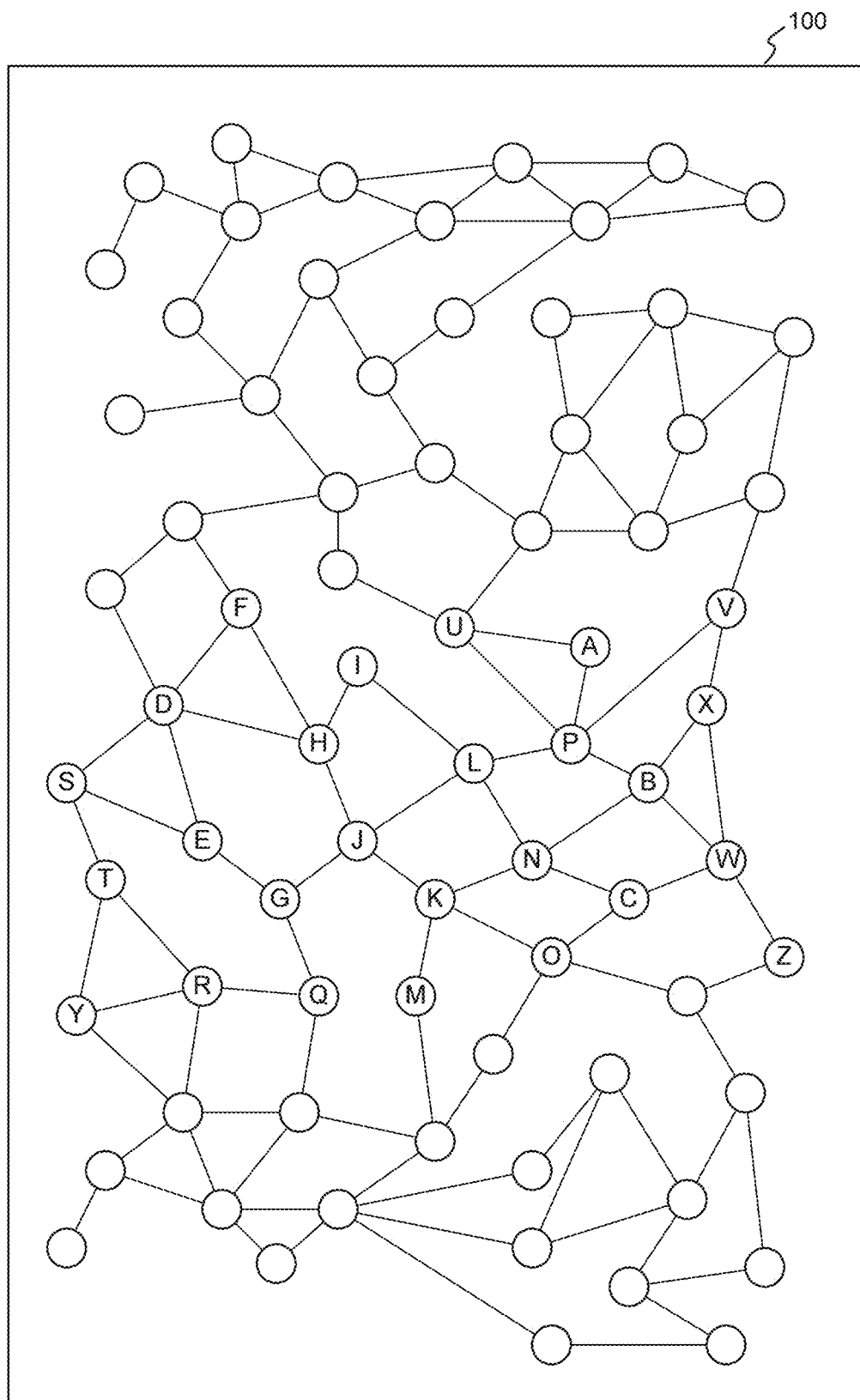
FIG. 1 is a pictorial diagram illustrating an exemplary corpus graph of data for use in description with regard to the disclosed subject matter.

According to aspects of the disclosed subject matter, disclosed is a data-efficient, graph-based convolutional network (GCN) system that combines elements of a relevant neighborhood and node convolutions to generate enhanced embedding vectors for nodes of the graph. More particularly, these enhanced embedding vectors, referred to as aggregated embedding vectors, combine embedding information of a target node (in the form of an embedding vector) with sub-graph/relevant neighborhood embedding information to form an aggregated embedding vector for the nodes of a corpus graph. These aggregated embedding vectors provide greater insight into relevant features of a given node in a corpus graph, which leads to improved identification of relevant nodes in the graph for recommendation to a user in response to a query.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

Reference is made to the terms embedding (or embedding information), embedding vector, neighborhood embedding vector, and aggregated embedding vector. For purposes of clarity and definition, an "embedding" or embedding value corresponds to, as is descriptive of, some particular aspect of an item of content. Typically, though not exclusively, embedding information (a set of embedding values of an item of content) is determined as a result of convolutions of an item of content by a suitably configured deep neural network. Typically, embedding information for an item of content is output by a deep neural network in the form of an embedding vector.

With regard to generating embedding information of an item of content, an embedding vector corresponding to an item of content is generated from both the item of content and metadata that may be associated with that item of content. The metadata may comprise, by way of illustration and not limitation, information regarding a content type (e.g., image, audio, video, data type, etc.) and textual content (e.g., descriptions of the item, titles, uniform resource identification data, etc.)

An embedding vector is a collection of embedding data, sometimes also called a feature vector. An embedding vector is an n-dimensional vector of embeddings (each embedding typically represented as a numerical value to facilitate processing and analysis) that represents multiple aspects of the corresponding item of content. As indicated above, typically though not exclusively, an embedding vector of an item of content is determined through convolution by a deep neural network, which is a machine learning model. As suggested, embedding vectors (both of a query item and other items of content in a corpus graph) are used to identify relevant/related content. As those skilled in the art will appreciate, the embedding vector space associated with these embedding vectors is often called a feature space. Additionally, and in accordance with aspects of the disclosed subject matter, in order to reduce the dimensionality of the embedding space, a number of dimensionality reduction techniques may be employed in generating an embedding vector for an item of content.

In contrast to the embedding vector, which is derived from the content item and its corresponding metadata, a neighborhood embedding vector refers to the combination or aggregation of embedding vector features derived from embedding vectors of content items in a target item's relevant neighborhood. The combination/aggregation of an item's own embedding vector and neighborhood embedding vector is referred to as the content item's aggregated embedding vector. According to embodiments of the disclosed subject matter and for illustration and not limitation, an aggregated embedding vector may comprise 2048 floating point values, with 1224 of these "floats" reserved for the target node's embedding vector, and 1224 floats reserved for the target node's neighborhood embedding vector.

In regard to the term "relevant neighborhood" as used herein, a relevant neighborhood should be interpreted as a sub-graph of nodes within a corpus graph whose elements (nodes) are viewed as being most relevant to a target node in contrast to other nodes in the corpus graph. Each node within the corpus graph will have its own relevant neighborhood and, typically but not exclusively, a relevant neighborhood for a first given node will be unique to a relevant neighborhood of a second given node.

For purposes of clarity and definition, the term "query" refers to an item of content for which one or more recommendations may be made. In this context, the user may or may not be actively seeking additional information with regard to the submission of the item of content to the online system. For example, a user's query may be initiated in response to the computer user interacting with an item of content without directly initiating the request.

As will be readily appreciated, many online systems maintain large bodies of user-supplied and/or user-generated content, and this body of content is often organized as a graph of content (also referred to as the corpus graph), with the graph nodes corresponding to an item of content, and edges between graph nodes representing relationships between items of content. These graphs of content can represent user/people relationships (as may be maintained by social networking services), interest graphs between people and topics, collections of data, and the like. In popular online services, these bodies of graph data often become extremely large and complex. As indicated above, Pinterest® maintains a graph of content/data that includes billions of pins organized on billions of boards, generated by millions of users. As will be readily appreciated, this corpus of content/data, referred to as a corpus graph, becomes extraordinarily complex and inter-related.

With regard to Pinterest®, and generally applicable to many social networking services that maintain content from users, users often organize related content, and the relationship connections in the corpus graph reflect these close relationships. As such, there are many areas within a corpus graph that have a high level of internal cohesion. For purposes of the disclosed subject matter, these areas are referred to as neighborhoods within the corpus graph. Each content item in the corpus graph will have a unique relevant neighborhood, such that the relevant neighborhood of a first item may or may not align similarly to the relevant neighborhood of a second item, even when both items are in the respective relevant neighborhoods of the other.

As indicated above, deep learning neural networks (i.e., graph convolutional networks or GCNs) must rely upon the entire corpus graph in order to generate embedding vectors for the various items of the corpus graph. These embedding vectors are used to identify similar and/or related content in regard to a "request." However, as the number of data points and relationships increase, processing and re-processing the embedding vectors of an entire corpus graph requires more and more time, requiring immense processing bandwidth. Keeping the embedding vectors of a corpus graph up-to-date, and searching for related content among billions of embedding vectors is viewed as being impractical if not impossible.

According to aspects of the disclosed subject matter, by selecting a relevant neighborhood for a target node within a corpus graph, an embedding vector that reflects embeddings of the target node as well as embeddings of a relevant neighborhood, i.e., an aggregated embedding vector, can be determined without the processing/convolution of the entire corpus graph. Of course, in a recommender system, leveraging both the embeddings of an item of content as well as the aggregated embeddings of the relevant neighborhood for an item of content leads to enhanced identification of related and/or relevant content that may be used by a recommender system in recommending content to a user.

To illustrate the generation of the aggregated embedding vectors for nodes within a corpus graph, reference is made to the figures. FIG. 1 is a pictorial diagram illustrating an exemplary corpus graph 100 for use in description and illustration with regard to the disclosed subject matter. Corpus graph 100 includes various nodes illustrated as circles in the graph 100 (each node corresponding to an item of content of the corpus graph) and connections or edges between nodes indicating relationships between the nodes. By way of illustration and not limitation, these relationships may correspond to co-occurrence in a collection of content items, references of a first content item to a second content item, and the like. For purposes of description and illustration, various nodes within the corpus graph 100 are labeled, including Nodes A-Z.

In contrast to actual corpus graphs that include billions of items of content with tens of billions of inter-connections, corpus graph 100 is quite simple. However, corpus graph 100 is suitable for describing aspects of the disclosed subject matter, including illustrating the selection of relevant neighborhoods for computing an aggregated embedding vector for a given node in accordance with aspects of the disclosed subject matter.

Figure 2:
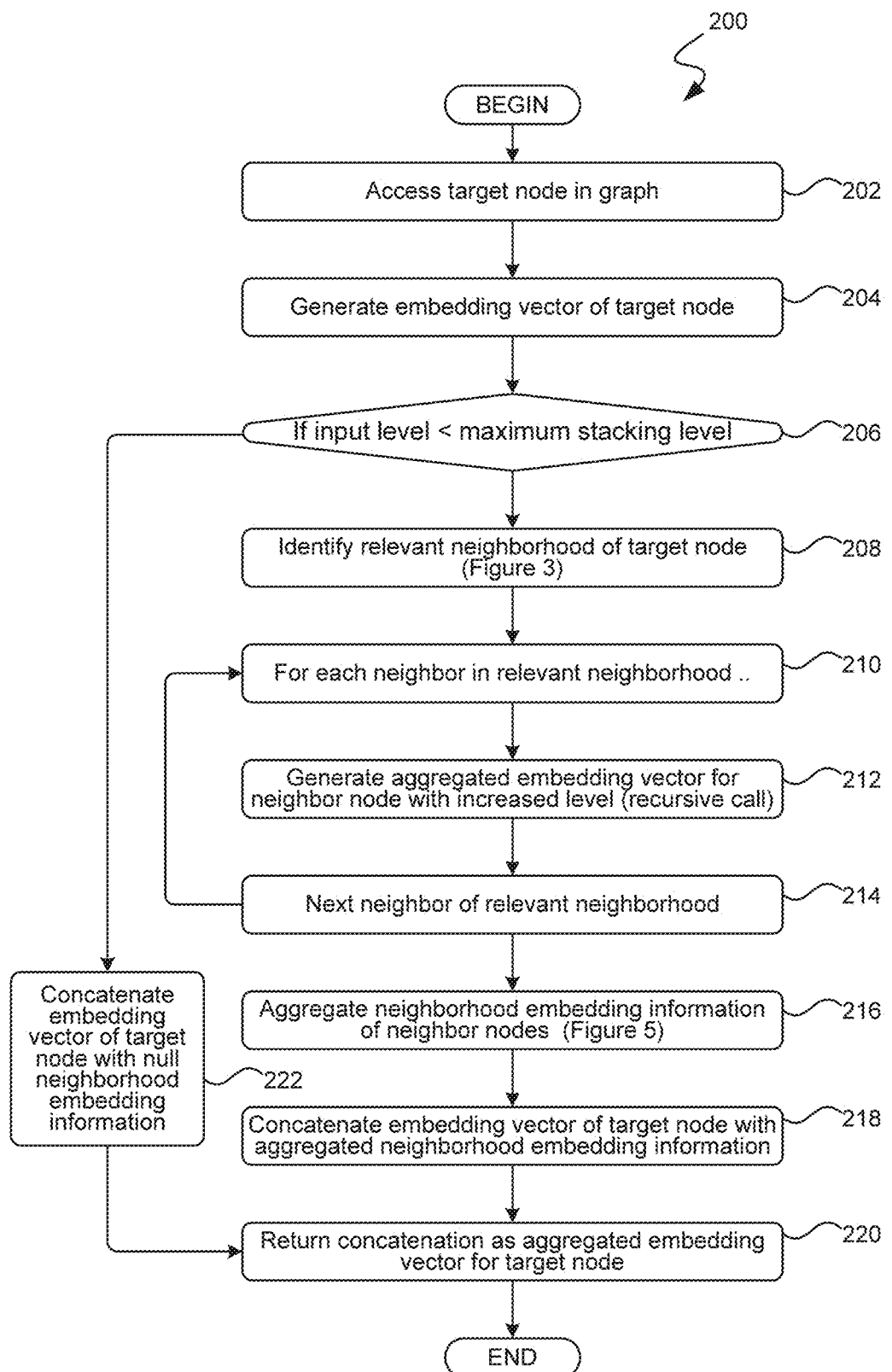
FIG. 2 is a flow diagram illustrating an exemplary routine suitable for generating an aggregated embedding vector for a query node that includes embedding values of the relevant neighborhood of the query node, and in accordance with aspects of the disclosed subject matter.

Reference is further made in regard to FIG. 2. FIG. 2 is a flow diagram illustrating an exemplary routine 200 suitable for generating an aggregated embedding vector for a query node that includes embedding values of the relevant neighborhood of the query node, and in accordance with aspects of the disclosed subject matter. For purposes of illustration, reference will be made in regard to Node J of corpus graph 100 being identified as the "target node" or "query node," particularly in regard to generating an aggregated embedding vector for Node J.

Regarding routine 200, this routine is described as a recursive routine, i.e., a routine that "calls" itself as needed to carry out its complete function. In regard to routine 200 and according to aspects of the disclosed subject matter, routine 200 relies upon an "input level" and a "maximum stacking level" to limit the number of recursive iterations that occur. According to aspects of the disclosed subject matter, this maximum stacking level corresponds to the number of neighborhood levels that may be used in generating the neighborhood portion of an aggregated embedding vector for a target node. In various embodiments of the disclosed subject matter, the number of neighborhood levels that are used is advantageously set to 2 or 3. The maximum stacking level could, in practice, be set to 2, meaning that the relevant neighborhood uses only the most important relevant neighbors of a target node (as determined by the counts accrued during a random walk to identify relevant neighbors, and not according to whether they are immediate neighbors in a corpus graph) to form the neighborhood embeddings for the target node. However, a maximum stacking level of 2 is viewed as being too limited and misses relevant information. In contrast, a maximum stacking level of 5 may also be used, though empirical data suggests that neighborhood information in the fifth level become so diffuse as to have limited, if any, impact within the neighborhood embedding values. While maximum stacking levels of 3 and 4 seem to yield similarly good results, efficiency may suggest limiting the stacking levels (i.e., the maximum stacking level) to 3.

In regard to routine 200, as part of an initial call to the routine 200, an initial input level of 0 is provided. Additionally, the target node is also an input parameter to the recursive routine 200. As those skilled in the art will then appreciate, an initial call to routine 200 identifies both the target node for which an aggregated embedding vector, $AEV_{tn}$, is sought, and sets the input level to 0 (indicating that this is the initial call).

Beginning at block 202, the target node (e.g., Node J) within the corpus graph 100 is accessed. At block 204, an embedding vector, $EV_{tn}$ corresponding to the target node, is generated. According to aspects of the disclosed subject matter, this embedding vector is generated from the target node itself and any metadata that may be associated with the target node. For example, assuming that Node J (the target node) is an image, an embedding vector, $EV_J$, is generated based on convolutions of a deep neural network of the image and further based on any metadata that may be associated with Node J. Convolving an item of content via a deep neural network to generate an embedding vector is described in greater detail below in regard to FIG. 8.

At decision block 206, a determination is made as to whether the input level has reached the maximum stacking level, which check serves to limit the amount of neighborhood information that is gathered and included in an aggregated embedding vector for the target node, and particularly in regard to the distance of neighbors considered when identifying the relevant neighborhood for the target node. Indeed, each recursive call increased the input level by one, up to the maximum stacking level. If, at decision block 206, the input level is not less than the maximum stacking level (indicating that the number of stacking levels of neighborhood embedding information has been reached), the routine 200 proceeds to block 222. Because the limit of stacking of neighborhood embedding information has been reached, at block 222, no additional neighborhood embedding information is generated for this target node. Accordingly, at block 222, the embedding vector, $EV_{tn}$, for the current target node is concatenated with a null representation of neighborhood embedding information, and at block 220 the resulting concatenation is returned as an aggregated embedding vector, $AEV_{tn}$, for this current target node at the current input level. Thereafter, the routine 200 terminates.

In regard to decision block 206, if the input level is less than the maximum stacking level (indicating that the number of stacking levels of neighborhood embedding information has not yet been reached), the routine 200 proceeds to block 208. At block 208, the relevant neighborhood of the inputted target node is identified. In a corpus graph such as corpus graph 100, the relevant neighborhood comprises those nodes in the corpus graph, that are directly or indirectly connected to the target node via at least one relationship/edge, that have the greatest relationship and/or impact to the target node. Neighboring nodes that frequently co-occur in collections with the target node are viewed as being more relevant and related to the target node than nodes that co-occur in collections less frequently. Generally speaking, those neighboring nodes having stronger relationships with the target node (e.g., frequency of co-occurrence, frequency of reference, similarity in features, and the like) are viewed as the relevant neighborhood of the target node. Determining the relevant neighborhood of the current target node is described in regard to routine 300 of FIG. 3 and relies upon a novel operation, referred to as a random walk, to identify a relevant neighborhood of a target node.

According to aspects of the disclosed subject matter, a "random walk" identifies relevant neighbors of a target node by relying upon the frequency of references from one node to another as recorded in the corpus graph. This random walk utilizes random selection of edge/relationships traversal in a manner that limits the distance/extent of a relevant neighborhood for a target node in identifying relevant neighbors, and relies upon frequency/strength of the various edges to identify a sub-graph of the corpus graph, where the sub-graph corresponds to the relevant neighborhood of the target node. In this manner, nodes that have stronger relationships in a given sub-graph of the corpus graph are identified as the relevant neighborhood of a given node.

Figure 3:
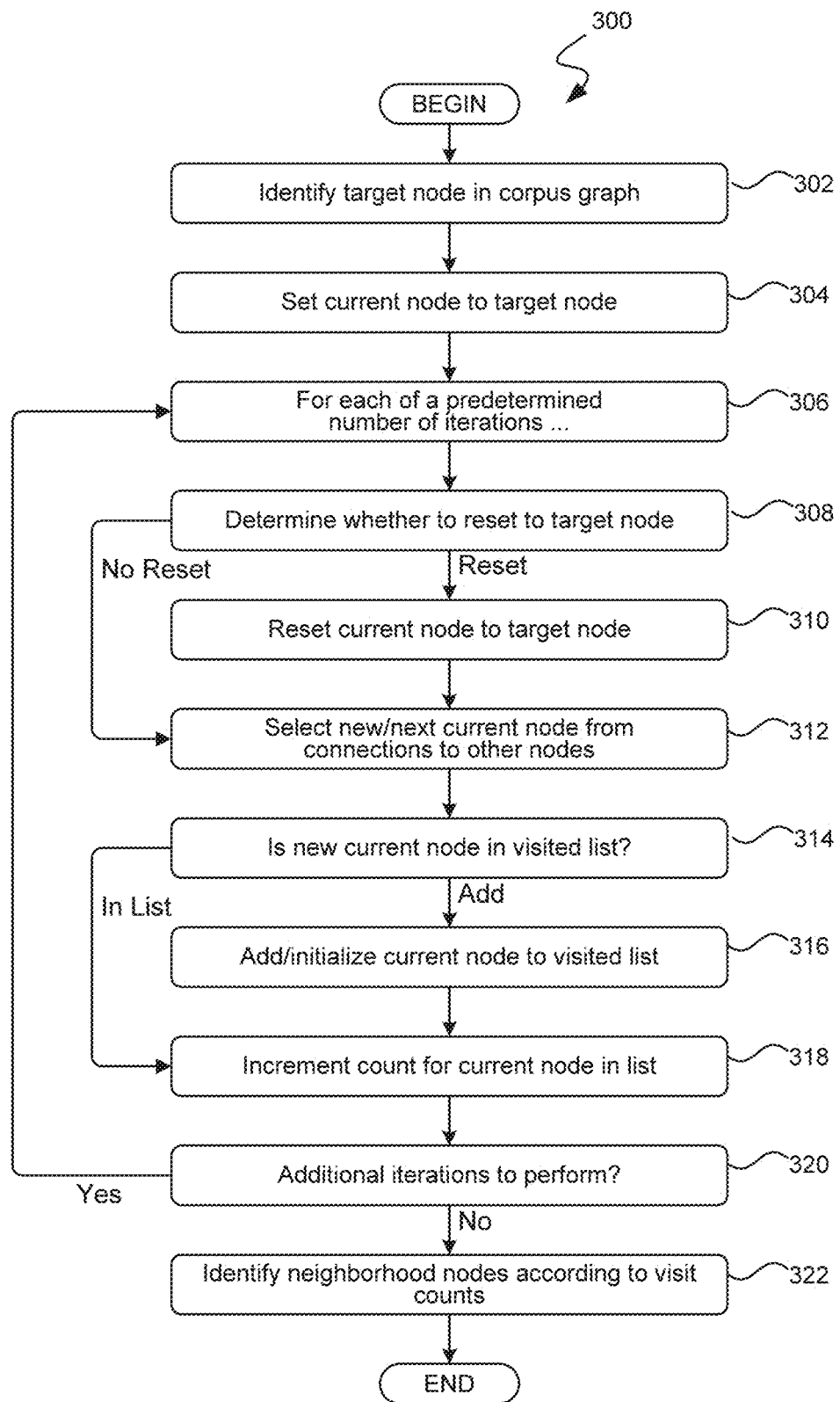
FIG. 3 is a flow diagram illustrating an exemplary routine suitable for identifying the relevant neighborhood of a target node in accordance with aspects of the disclosed subject matter.
Figure 4A:
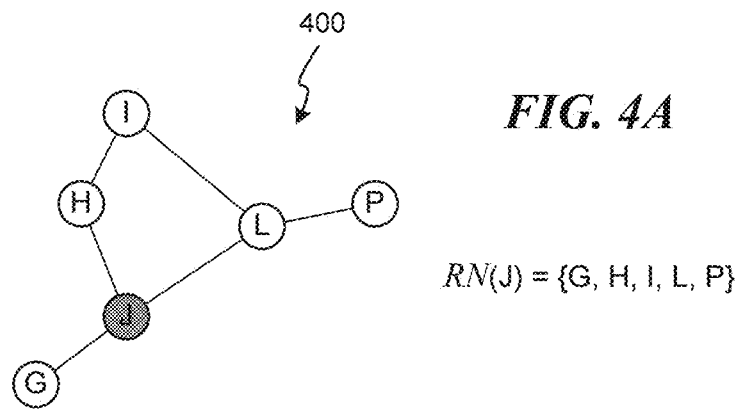
FIGS. 4A-4F are pictorial diagrams illustrating exemplary sub-graphs of the corpus graph of FIG. 1, where each sub-graph corresponds to a relevant neighborhood of a node of the corpus graph, in accordance with aspects of the disclosed subject matter.
Figure 4B:
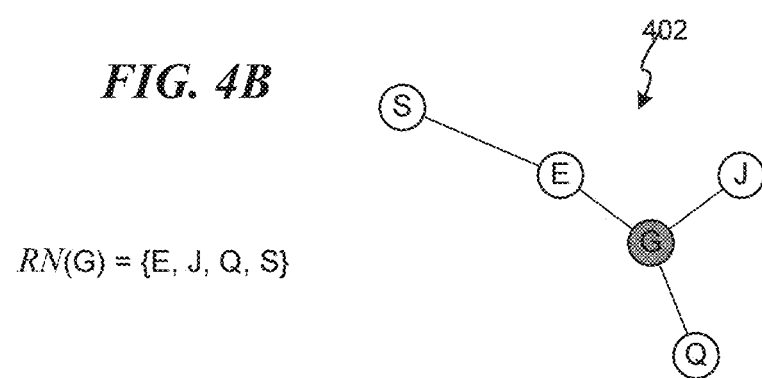
Figure 4C:
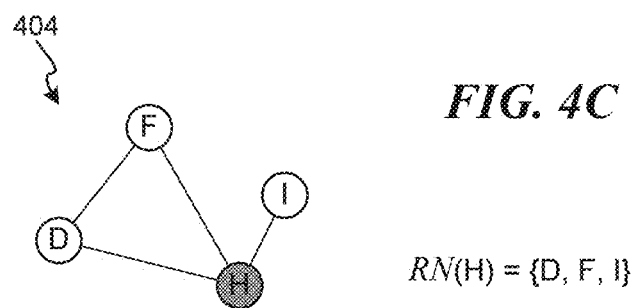
Figure 4D:
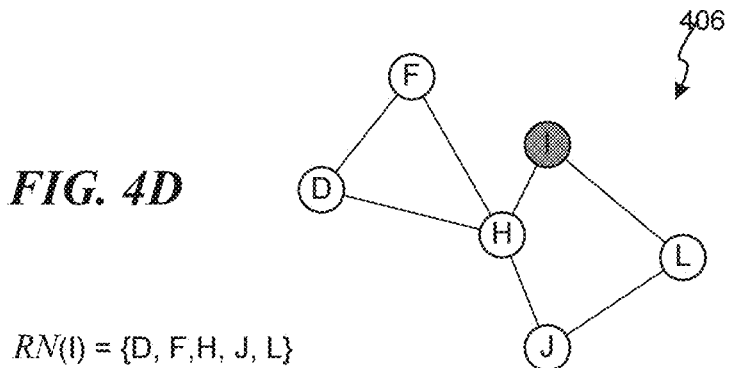
Figure 4E:
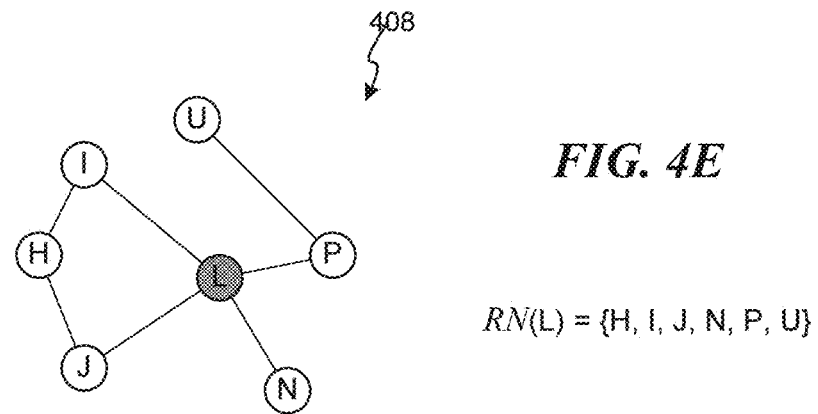
Figure 4F:
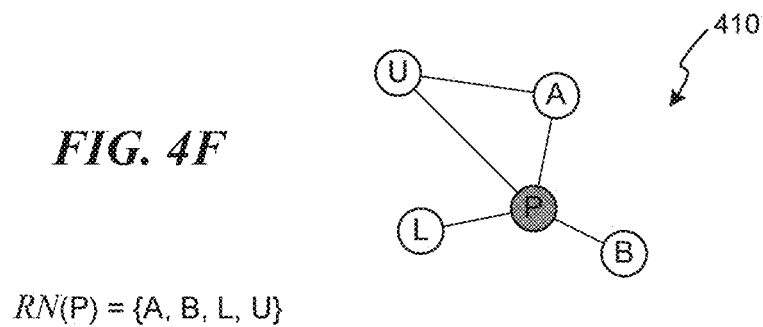

Turning to FIG. 3, FIG. 3 is a flow diagram illustrating an exemplary routine 300 suitable for implementing aspects of a random walk for identifying the relevant neighborhood of a target node in a corpus graph and in accordance with aspects of the disclosed subject matter. As with routine 200, the target node is an input parameter to routine 300.

At block 302, the target node in the corpus graph 100 is identified. At block 304, a temporary variable for use in routine 300, referred to as the "current node", is initialized with the inputted target node. For illustration purposes, assume that the target node is Node J of corpus graph 100.

At block 306, an iteration loop is begun, starting with the current node. The various steps within this iteration are carried out to identify the important, relevant nodes to the target node. To ensure that the important neighborhood nodes to the target node are identified, a sufficient number of iterations should be selected in order to generate an accurate representation of the important, relevant nodes. While there are many possible numbers of iterations, in one embodiment, 10000 iterations may be carried out efficiently and on-demand.

At block 308 and as a first operation in the random walk, a determination is made as to whether to reset the current node back to the target node. Resetting the current node back to the target node keeps the selections of "next" current nodes from branching too far away from the target node. According to aspects of the disclosed subject matter, the determination to reset back to the target node is a random determination. For example, in one embodiment a random selection of one of three choices is made, where one of the three choices cause a reset of the current node back to the target node, while the other two choices do not cause a reset. Of course, numerous other ratios for resetting (e.g., 1 out of 4, 2 out of 5, 2 out of 7, etc.) may be used according to the desired breadth and depth of the identified neighborhood of the target node. Regarding this random selection at block 308, if the random determination is to reset the current node back to the target node, at block 310 the current node is reset to point back to the target node. Alternatively (not to reset), the routine 300 proceeds from block 308 directly to block 312.

At block 312 and with reference to the current node, a selection of a connection from among the various connections between the current node and other, connected nodes is made. This selection is made as a random selection from among the connections between the current node and those other nodes, and takes into consideration the frequency of connections between the current node and the another node. For example and with reference to corpus graph 100 of FIG. 1, Node F is connected to both Nodes D and H. Without considering the frequency between any nodes, a random selection of a next current node from Node F would result in a 50% likelihood of selecting either Node D or Node H. However, if the frequency of relationships between Nodes F and D were three times more frequent than between Nodes F and H, then the likelihood of selection of Node D from Node F would be 75%. As part of the random selection of a next/new current node of block 312, the selected node becomes the new current node.

At block 314, a determination is made as to whether the new current node is already in a "visited list" for the current node. This visited list tracks those nodes that have been visited as part of the random walk for the current node, and further tracks and/or indicates how many times each node in the list has been visited during this random walk. Accordingly, at block 314, if it is determined that the new current node is not already identified in the visited list, at block 316, the current node (e.g., Node I) is added to the visited list and initialized to zero (no previous visits).

At block 318, the visit count in the visited list for this new current node is incremented, indicating a new visit as part of the random walk. At block 320, after having completed the steps of an iteration described above, if there are more iterations to perform, the routine 300 returns to block 306 for the next iteration. If there are no additional iterations to perform, the routine 300 proceeds to block 322.

At block 322, the visit list is examined to determine which nodes are most relevant to the target node according to the various visit counts. This selection of the relevant neighborhood for the target node may be made according to any number of criteria based on the number of visits at the various nodes, such as (by way of illustration and not limitation): the top n-most nodes that have the highest visit count (e.g., the top 200 most-frequently visited nodes); the top n-most percentage of nodes that have the highest visit count (e.g., the top ten percent of the nodes that were visited); the top n-most nodes that have a threshold number of visits (e.g., those nodes that have been visited at least 20 times); the top n-most nodes that collectively represent at least a threshold percentage of all visits (e.g., the top-most visited nodes that collectively comprise at least 15% of the visits), and the like. In many instances, the total number of nodes that were visited may be a factor in determining threshold numbers and/or percentages.

FIGS. 4A-4F are pictorial diagrams illustrating exemplary sub-graphs of the corpus graph of FIG. 1, where each sub-graph represents a relevant neighborhood of a target node of the corpus graph, in accordance with aspects of the disclosed subject matter. In each of these sub-graphs (including sub-graphs 400-410), the shaded node of the respective sub-graph represents the target node and the unshaded nodes represent the neighbor nodes as determined by the random walk process. With reference to FIGS. 4A-4F, sub-graph 400 illustrates the relevant neighborhood of target Node J as comprising the set of Nodes G, H, I, L, and P, denoted as RN(J)={G, H, I, L, P}. The following list illustrates exemplary relevant neighborhoods for various nodes within the corpus graph, as may be determined by the random walk process of routine 300:

RN(J)={G, H, I, L, P};
RN(G)={E, J, Q, S};
RN(H)={D, F, I};
RN(I)={D, F, H, J, L};
RN(L)={H, I, J, N, P, U}; and
RN(P)={A, B, L, U};

According to aspects of the disclosed subject matter and as shown in FIGS. 4A-4F, relevant neighborhood nodes for a target node, such as Node J, do not need to be directly connected to the target node. For example, Nodes D, F, and J of sub-graph 406 are only indirectly connected to target Node I, yet included in the relevant neighborhood of target Node I. In processing the neighborhood nodes for neighborhood embedding information, the link distance between a target node and a neighborhood node does not play a factor in this part of routine 300.

After identifying the nodes of the relevant neighborhood of the target node, the routine 300 terminates.

Returning again to routine 200, after having identified the relevant neighborhood for the current target node, at block 210 an iteration loop is begun for purposes of generating neighborhood embedding information from the current target node's relevant neighborhood. This iteration process iterates through each of the nodes of the current target node's relevant neighborhood. With referent to the example about, for target Node J, the iteration loop iterates through the set of Nodes G, H, I, L and P.

At block 212 and as part of iterating through the neighborhood nodes, a recursive call to this same routine 200 is made with the target node being the currently iterated neighbor node and an incremented/increased input level. Continuing the example from above, routine 200 may be called for target Node G with an input level of 1.

After determining an aggregated embedding vector for a neighbor node, at block 214 if there are additional neighbor nodes to process, the routine 200 returns to block 210 for the additional processing/iterations. Alternatively, once all neighbor nodes have been processed, meaning that aggregated embedding vectors for each of the neighbor nodes of the current target node have been generated, the routine 200 proceeds to block 216.

Figure 5:
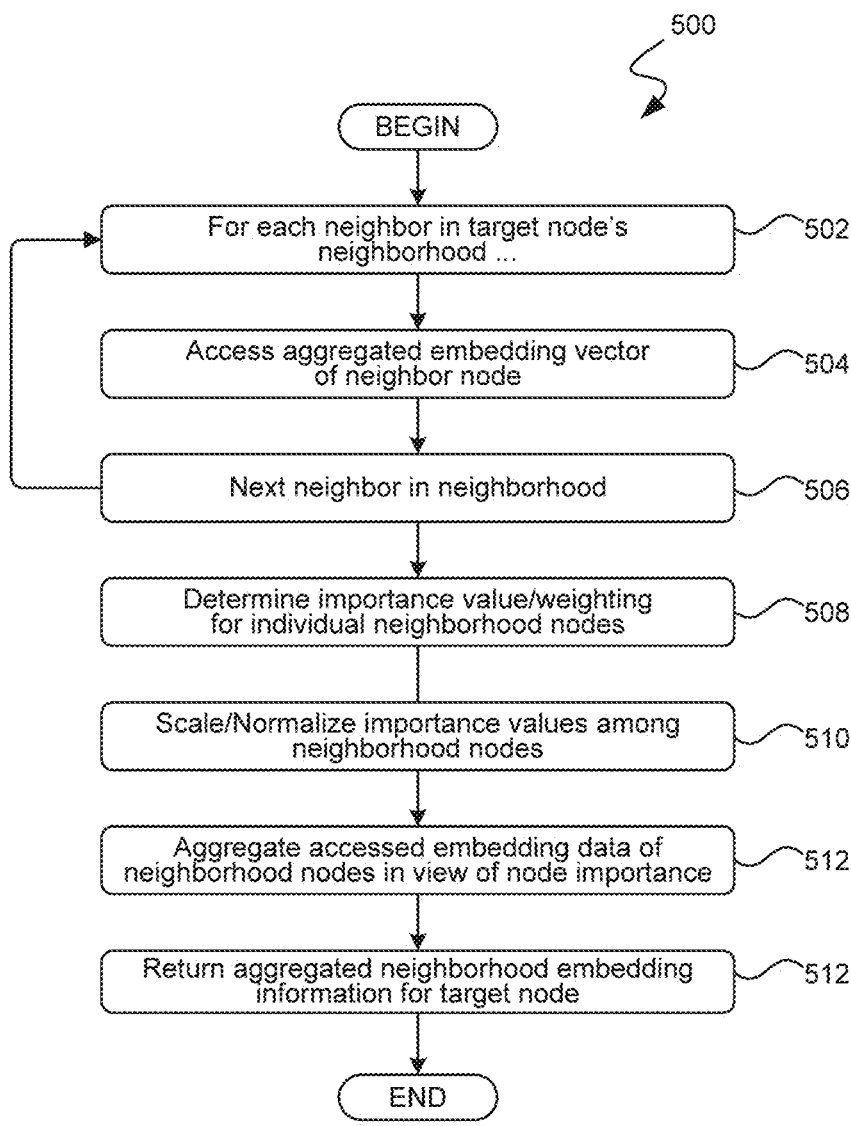
FIG. 5 is a flow diagram illustrating an exemplary routine for aggregating neighborhood embedding vectors into neighborhood embedding information for a target node in accordance with aspects of the disclosed subject matter.

At block 216, the aggregated embedding vectors of the neighbor nodes are aggregated and combined into neighborhood embedding information. With reference to FIG. 5, FIG. 5 is a flow diagram illustrating an exemplary routine 500 for aggregating neighborhood embedding vectors of neighbors of a target node into neighborhood embedding information and in accordance with aspects of the disclosed subject matter.

Beginning at block 502, an iteration loop is begun to iterate through each of the target node's neighbors. With regard to the example discussed above, assuming that the target node is Node J, this means that routine 500 iterates through each of Nodes G, H, I, L and P. At block 504, the aggregated embedding vector of the currently iterated neighbor node (as determined by the iteration of routine 200) is accessed. At block 506, the iteration returns to block 502 for further accessing aggregated embedding vectors of the neighborhood nodes, or to block 508 once the aggregated embedding vectors neighborhood nodes has been accessed.

At block 508, an importance value is determined for each of the neighborhood nodes. Importance values reflect that certain nodes within a target node's relevant neighborhood have a greater relationship or relevance to the target node than other nodes within the relevant neighborhood. This step (block 508) is used to capture this importance. According to aspects of the disclosed subject matter, importance values for the nodes are determined according to the visit counts of the various neighborhood nodes, as listed in the visit list corresponding to the target node (as discussed above in regard to routine 300) and determined during the identification of the relevant neighborhood.

At block 510 and according to one embodiment of the disclosed subject matter, the aggregated visit counts of the neighborhood nodes are proportionally scaled, or normalized among the nodes, such that they collectively total 100. These proportional scales are then applied in generating the neighborhood embedding information where, for each embedding/feature of the neighborhood embedding information, a random selection is made among the embedding vectors of the various neighborhood nodes with the likelihood of the random selection of a node's embedding is determined according to the node's scaled value. For example, assume that the neighborhood nodes include Nodes G, H, I, L and P as mentioned above. Assume also that the visit counts for these nodes are 20, 10, 15, 35 and 20 respectively. As can be seen in this example, Node L would likely be considered more relevant to target Node J than the other nodes. Scaling these counts to 100 is simple, in this example, because they collectively total 100. Hence, for each embedding in the neighborhood embedding information, the likelihood of selecting an embedding from a given neighborhood node corresponds to 20% for Node G, 10% for Node H, 15% for Node I, 35% for Node L, and 20% for Node P.

In an alternative embodiment, aggregating values for the neighborhood embedding information from the neighborhood nodes according to the importance of the various neighborhood nodes includes identifying those embedding values directed to the same aspect/feature and choosing a resulting value for that aspect/feature. In various embodiments, where a conflict arises, the aspect/feature of the embedding vector is selected over network embedding information, assuming that the values of the current neighbor have more influence than the neighbor's neighbors. Where there is no value for an aspect/feature from the embedding vector, the value from the network embedding information may be used.

In yet another embodiment, the various elements of the neighborhood embedding information are multiplied by the importance value of the corresponding neighborhood node. Thereafter, the average—now a weighted average—is determined among the neighborhood nodes for each element.

At block, 512, the embedding values for the neighborhood embedding information are selected and aggregated according to the node importance of the various neighborhood nodes. As described above by way of example, for each embedding in the neighborhood embedding information, the likelihood of selecting an embedding from a given neighborhood node corresponds to the nodes' scaled values. Thereafter, at block 514, the aggregated neighborhood embedding information for the current target node is returned and the routine 500 terminates.

Returning to routine 200 of FIG. 2, after generating the neighborhood embedding information for the current target node, at block 218, the embedding vector of the current target node and the neighborhood embedding information for the current target node are concatenated, forming an aggregated embedding vector for the target node. At block 220, the aggregated embedding vector for the target node is returned. Thereafter, the routine 200 terminates.

Regarding the recursive nature of routine 200, as those skill in the art will appreciate, while recursive calls may be advantageous for coding purposes, recursive calls may also be implemented in a non-recursive manner without departing from the scope of the functionality. Accordingly, while routine 200 is written as a recursive routine, this is illustrative and not limiting upon the disclosed subject matter.

Figure 6:
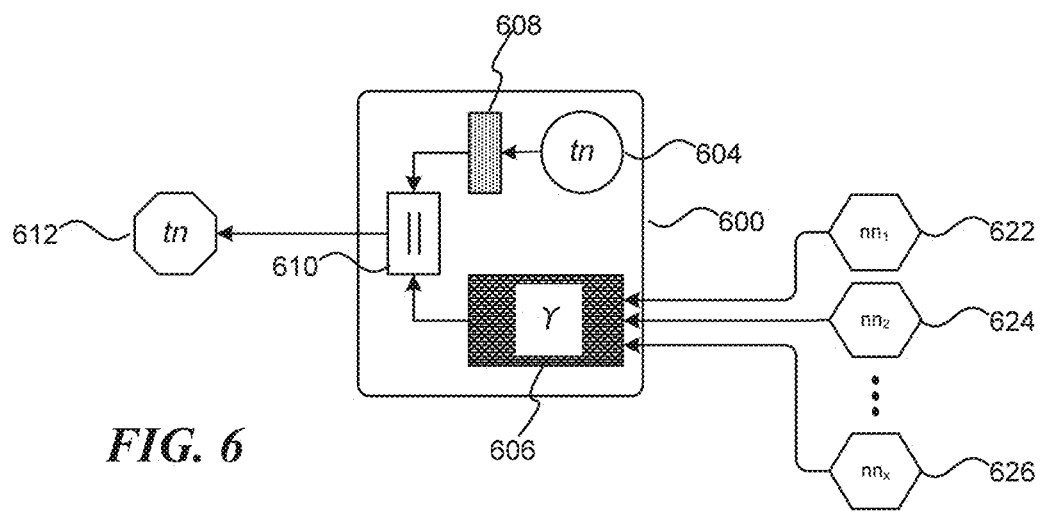
FIG. 6 is a pictorial diagram illustrating the generation process of an aggregated embedding vector for each level of recursion in accordance with aspects of the disclosed subject matter.

Regarding the recursive process described in routine 200, those skilled in the art will appreciate that at each level, as is the nature of recursive calls, a similar process is carried out. This process includes the convolution of a target node to generate an embedding vector, the aggregation of embedding vectors of the target node's neighbors to generate neighborhood embedding information, and the concatenation of the two which forms the aggregated embedding vector of the target node. FIG. 6 is a pictorial diagram illustrating the generation process 600 of an aggregated embedding vector 612, as carried out for each level of recursion and in accordance with aspects of the disclosed subject matter.

This process 600 includes, accessing a target node 604 and convolving 608 the target node. Additionally, aggregated embedding vectors of the target node's neighbors, such as aggregated embedding vectors 622-626, are combined/aggregated 606 into neighborhood embedding information, as described above in regard to routine 500 of FIG. 5. The embedding vector and the neighborhood embedding information are then concatenated 610 into an aggregated embedding vector 612 for the target node.

As indicated above, this process 600 is a recursive process, particularly in regard to generating the aggregated embedding vectors of the target node's neighbors. Moreover, and as mentioned above, the recursive nature is limited to some predetermined fixed level, referred to as the maximum stacking level (i.e., stacking the neighborhood embedding information from multiple levels). This allows for the identification of localized neighborhoods and the influence that these neighborhoods have on a target node.

Figure 7:
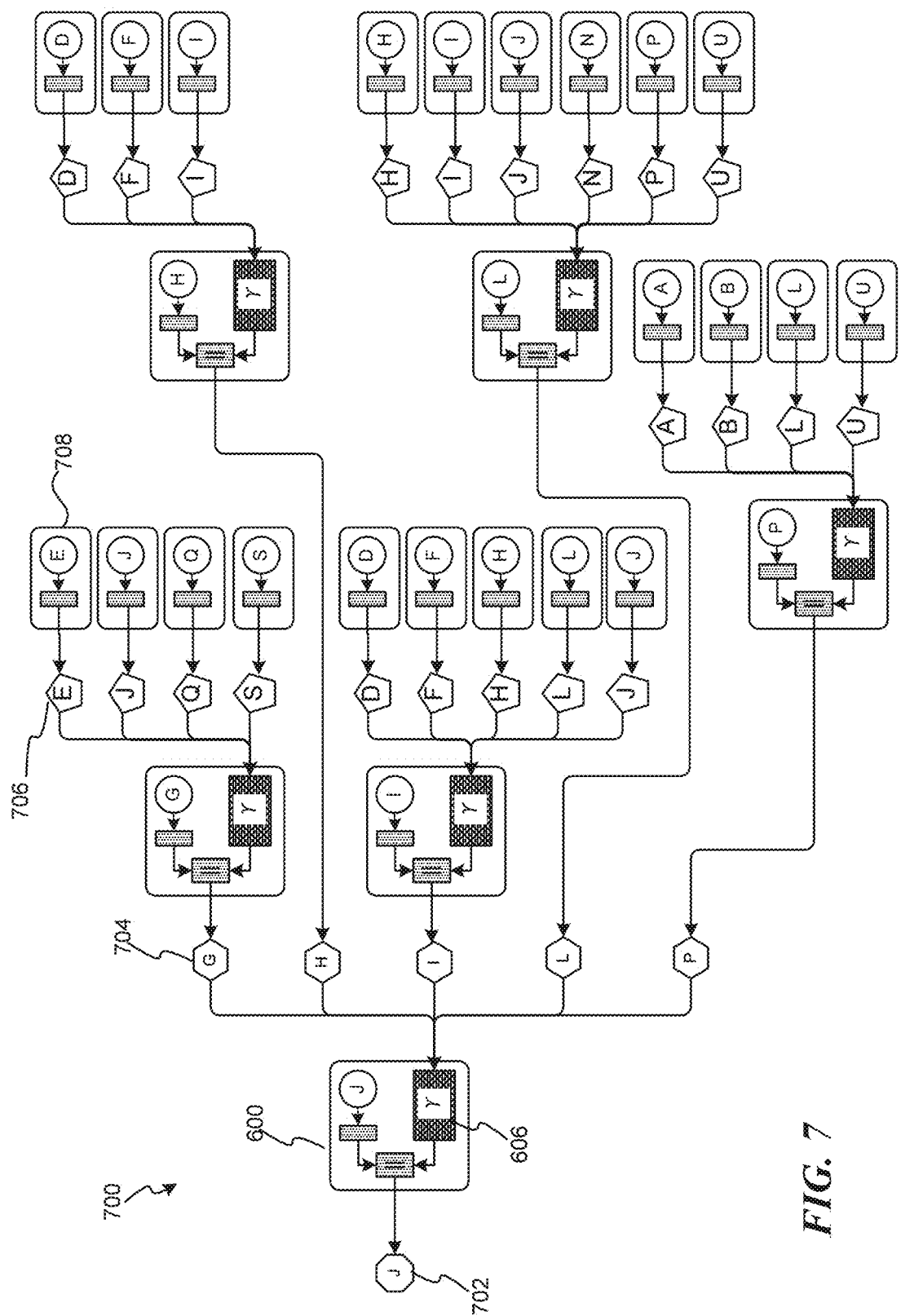
FIG. 7 is a pictorial diagram illustrating the exemplary generation of an aggregated embedding vector for a target node according to aspects of the disclosed subject matter.

FIG. 7 is a pictorial diagram illustrating the exemplary generation 700 of an aggregated embedding vector 702 for a target node, Node J, of corpus graph 100, according to aspects of the disclosed subject matter. As can be seen, the generating process includes the application of the process 600 with regard to Node J to generate the aggregated embedding vector 702. As can be seen, input to the combination/aggregation 606 of Node J's neighbors includes aggregated embedding vectors for Nodes G, H, I, L and P.

As can be seen, each of Node J's neighbors are similarly processed to generate aggregated embedding vectors. Each includes a convolution of a node in addition to the concatenation of the convolved embedding vector with neighborhood embedding information. Of difference from the processing of target Node J is the fact that in processing the embedding vectors of Node J's neighbors the input level does not reach as far to other neighbors, being limited each time in each recursive process. As can be seen, in processing the aggregated embedding vector for Node G, embedding vectors for Node G's neighbors, including Nodes E, J, Q, and S, are also processed. However, since the input level is reached at processing Node E, Node E's neighbors are not factored into the embedding vector 706 for Node E. Also, for illustration purposes the processing 708 of the final level nodes is simplified, showing only the convolution of the node and not showing the aggregation of null neighborhood embedding information. Also, because each increased level of aggregated embedding vector is based on less neighborhood embedding information, the various levels of aggregated embedding vectors in FIG. 7 are shown in slightly different shapes. More particularly, the aggregated embedding vector of level 0 (for target Node J) is shown as an octagon, the aggregated embedding vectors of level 1 (e.g., for Node G) are shown as a hexagon, and the aggregated embedding vectors of level 2 (e.g., for Node E) are shown as pentagons.

Of course, when a corpus graph comprises billions of nodes, processing an aggregated embedding vector for each node in the corpus graph can involve significant processing bandwidth and time. Indeed, generating these aggregated embedding vectors for nodes in a large corpus graph can be done in an offline and/or batch manner but still requires substantial processing resources and time. Those skilled in the art will appreciate that in such circumstances, many IT professionals will turn to an implementation of MapReduce, such as Apache's Hadoop, in order to make use of an array of computer systems to process/generate the vectors.

As those skilled in the art will appreciate, MapReduce is a programming model and an associated implementation for processing and generating big data sets with a parallel, distributed algorithm on a cluster. A MapReduce implementation comprises "mappers" and "reducers." A mapper represents an algorithm that, for a given input value, generates an output. A reducer is that algorithm that aggregates output values of mappers and/or other reducers. The "MapReduce" orchestrates the processing by marshalling the distributed servers, running the various tasks in parallel, managing all communications and data transfers between the various parts of the system, and providing for redundancy and fault tolerance.

In regard to the disclosed subject matter and with regard to FIGS. 6 and 7, the convolution operations, such as convolution 608, are viewed as mappers in that they take a given input, i.e., a target node, transform the input with various operations, and generate an output value, i.e., an embedding vector of the target node. In contrast, aggregation 606 is an example of a reducer, accepting outputs of other mappers and/or reducers. While block 600 illustrates a combination 610 to combine the convolution of the target node with network embedding information resulting from aggregation 606 to generate an aggregated embedding vector 612, this distinction was a logical distinction for illustration purposes. However, in various embodiments of the disclosed subject matter, the aggregation 606 and combination 610 are included in a single reducer operation to generate the aggregated embedding vector 612.

A common approach to generating results (e.g., aggregated embedding vectors) for nodes in a corpus graph is to iterate through all of the nodes and, for each node, generate an aggregated embedding vector. The various inputs are farmed out to a MapReduce implementation which, for a given target node in the corpus graph, determines the embedding vector for the target node, the neighborhood embedding information for the target node and, as part of the final reducer, combines the two values into an aggregated embedding vector. This approach, while accomplishing the desired results, can be extraordinarily inefficient in terms of processing bandwidth and time consuming due to the inefficiencies in processing. To illustrate and with regard to diagram 700 of FIG. 7, consider that in this simple diagram, Node J appears as an input to a mapper/convolution on four occasions. Of course, computing the embedding vector for Node J each time it is requested constitutes a significant inefficiency.

According to aspects of the disclosed subject matter, nodes of the corpus graph are processed in a unique manner such that only two "passes" must be made over the corpus graph to generate the aggregated embedding vectors by a MapReduce implementation. In this novel approach, rather than processing each target node to completion (i.e., generating its aggregated embedding vector) an embedding vector is generated (via convolution mappers) for each node in the corpus graph. In a first pass/step, the generated embedding vectors are, at least temporarily, stored with the corresponding target nodes. In a next pass, as the target nodes are available, the relevant neighborhoods for each of the target nodes is accessed and aggregated (via aggregation mappers) into a corresponding aggregated embedding vector. Indeed, while FIGS. 6 and 7 suggest one or more intermediate passes depending on the level of stacking used in determining neighborhood embedding information, these are logical steps and a single aggregation reducer could conduct the aggregations and combinations of the embedding vectors, including the intermediate aggregations (i.e., the first level aggregated embedding vectors.)

According to additional embodiments of the disclosed subject matter, in the event that relevant neighborhoods for the nodes of the corpus graph are not already generated, in a first embodiment, in addition to configuring the MapReduce framework to generate the aggregated embedding vectors for the nodes of the corpus graph, a process may be executed to iterate through the nodes of the corpus graph, and for each node, determine the node's relevant neighborhood and associate that relevant neighborhood with the node. Alternatively, the mapper function of the MapReduce framework may be additionally configured to generate the relevant neighborhood for each node along with generating the embedding vector of the node. Still further, an additional mapper function may be added to the framework and configured to iterate through the nodes of the corpus graph and, for each node, generate the node's relevant neighborhood within the corpus graph and associate the relevant neighborhood with the node.

Figure 17:
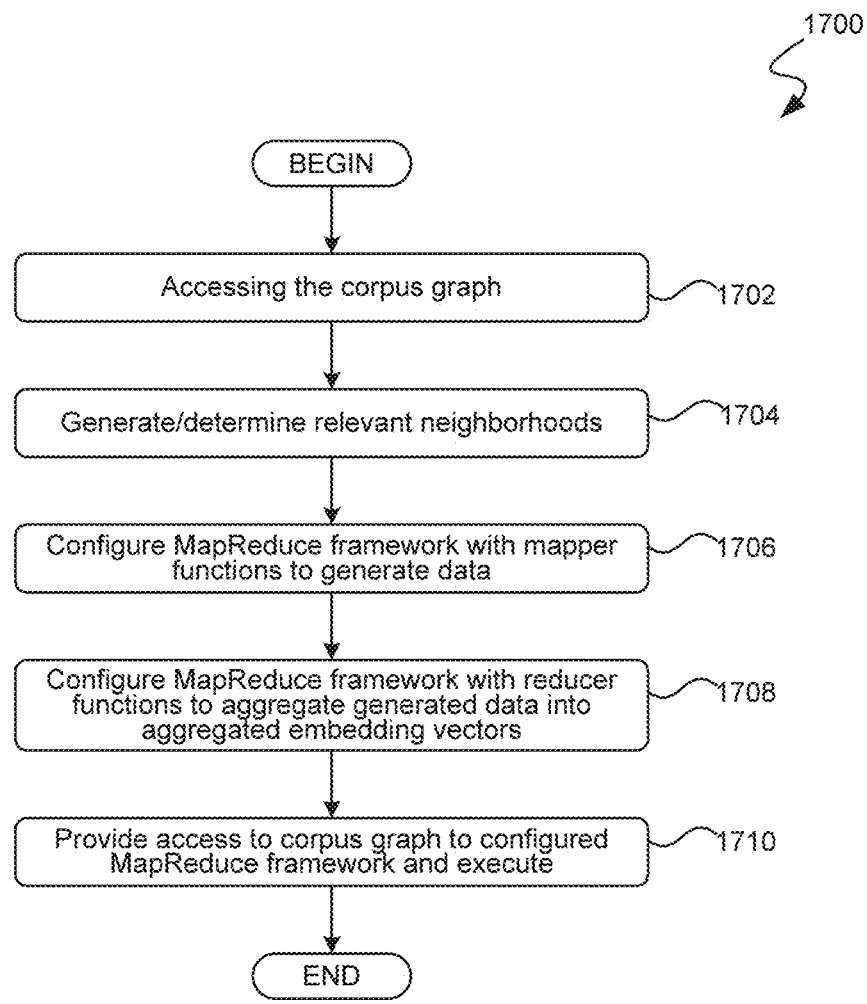
FIG. 17 is a flow diagram illustrating the configuration and execution of an executable MapReduce framework to generate aggregated embedding vectors for a plurality of nodes in a corpus graph, in accordance with aspects of the disclosed subject matter.

Turning to FIG. 17, FIG. 17 is a flow diagram illustrating an exemplary routine 1700 suitable for efficiently generating aggregated embedding vectors for each of a plurality of nodes in a corpus graph. Beginning at block 1702, the corpus graph (such as corpus graph 100) is accessed.

At block 1704, the executable various calls are made to generate and/or determine the relevant neighborhoods of the each of the various nodes to be processed. According to aspects of the disclosed subject matter, generating relevant neighborhoods of any given node is set forth above in regard to routine 300 of FIG. 3. Of course, in many instances the relevant neighborhood of a given node may have already been determined and cached, in which case the neighborhood for that node is simply cached. In one embodiment, the nodes are processed in batch by one or more computers that have multiple processing cores, e.g., 128 processing cores.

At block 1706, the MapReduce framework is configured with one or more mapper functions that, in execution, generate embedding vectors for the various nodes of the corpus graph. These embedding vectors are based on the nodes themselves, not on their relevant neighborhoods.

At block 1708, the executable MapReduce framework is configured with one or more reducer functions that, in execution, aggregate the generated data of the mapper functions (in generating embedding vectors) to produce a plurality of aggregated embedding vectors for the corresponding plurality of nodes in the corpus graph.

With the MapReduce framework suitably configured, the exemplary routine 1700 provides access to the corpus graph to the MapReduce framework and further causes the MapReduce framework to execute. Of course, as those skilled in the art will appreciate, this execution will then iterate through the various nodes of the corpus graph, under the direction of a coordination component, to generate the aggregated embedding vectors for the nodes of the corpus graph.

By way of illustration and example, and according to aspects of the disclosed subject matter, in regard to block 1704, an information table such as the following, Table 1, may be generated for nodes of the corpus graph.

TABLE 1

Node and Relevant Neighbor data

| Node | Neighbor$_1$ | Neighbor$_2$ | Neighbor$_3$ | ... | Neighbor$_x$ |
|---|---|---|---|---|---|
| $N_1$ | $Nbr_{11}$ | $Nbr_{12}$ | $Nbr_{13}$ | | $Nbr_{1x}$ |
| $N_2$ | $Nbr_{21}$ | $Nbr_{22}$ | $Nbr_{23}$ | | $Nbr_{2x}$ |
| . | | | | | |
| . | | | | | |
| . | | | | | |
| $N_n$ | $Nbr_{n1}$ | $Nbr_{n2}$ | $Nbr_{n3}$ | | $Nbr_{nx}$ |

With regard to block 1706, the MapReduce framework is configured with one or more mapper functions. In one instance, the mapper functions operate to take a given node (or it's constituent elements) and generate embedding vectors for the nodes, producing a table of data having a key (the node) and a value (the embedding vector), as shown in Table 2, below.

TABLE 2

Result of Mapper Function: Node/Embedding Vector data

| Key (Node) | Value (node embedding vector) |
|---|---|
| $N_1$ | EmbVector$_1$ |
| $N_2$ | EmbVector$_2$ |
| . | |
| . | |
| . | |
| $N_n$ | EmbVector$_n$ |

Another mapper function (or series of mapper functions) in the MapReduce framework is configured to take the Node/Relevant Neighbor data, e.g., as set forth in Table 1, into data that may be readily processed by one or more reduce functions. In this regard, the data set associating the node with its relevant neighborhood is mapped into data sets having a node, a neighbor node, and the embedding vector of the neighbor node, as shown in Table 3, below.

TABLE 3

Result of Mapper Function: Node/Neighbor/Embedding Vector data

| Key (Node) | Value 1 (Neighbor Node) | Value 2 (Embedding Vector - Neighbor Node) |
|---|---|---|
| $N_1$ | $Nbr_{11}$ | $EmbVector_{N11}$ |
| $N_1$ | $Nbr_{12}$ | $EmbVector_{N12}$ |
| . | | |
| . | | |
| . | | |
| $N_1$ | $Nbr_{1x}$ | $EmbVector_{N1x}$ |
| $N_2$ | $Nbr_{21}$ | $EmbVector_{N21}$ |
| . | | |
| . | | |
| . | | |
| $N_2$ | $Nbr_{2x}$ | $EmbVector_{N2x}$ |
| $N_3$ | $Nbr_{3x}$ | $EmbVector_{N31}$ |
| . | | |
| . | | |
| . | | |
| Nn | $Nbr_{nx}$ | $EmbVector_{Nnx}$ |

To complete the processing and with these (and possibly other tables as may be required according to the MapReduce framework being utilized), one or more reduce functions, or sequence of reducer functions, of the MapReduce framework are configured to aggregate the information into aggregated embedding vectors for each of the nodes in the corpus graph, as illustrated in Table 4, below.

TABLE 4

Result of Reducer Function(s): Node/Aggregated Embedding Vector data

| Key (Node) | Value (aggregated embedding vector) |
|---|---|
| $N_1$ | $AgEmbVector_1$ |
| $N_2$ | $AgEmbVector_2$ |
| . | |
| . | |
| . | |
| $N_n$ | $AgEmbVector_n$ |

As will be appreciated, these MapReduce functions, both mappers and reducers, are configured to efficiently carry out the generation of the aggregated embedding vectors for each of the nodes in the corpus graph, as outlined in FIGS. 5, 6 and 7 above.

At block 1710, after having configured the MapReduce framework, the nodes of the corpus graph, with their relevant neighborhoods, is passed to the MapReduce framework and the framework is executed to generate the aggregated embedding vectors for the nodes of the corpus graph. Thereafter, routine 1700 terminates.

Figure 8:
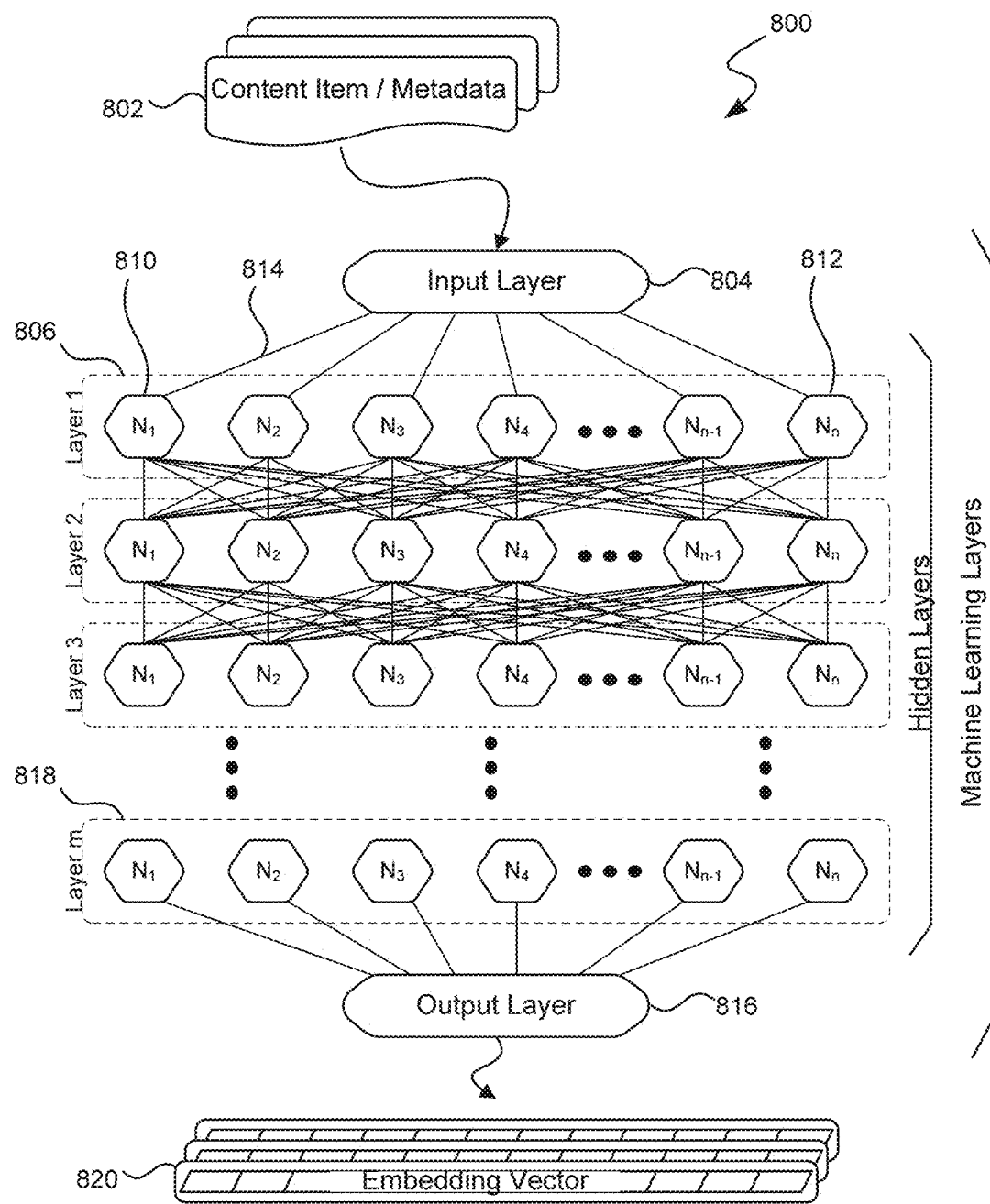
FIG. 8 is a pictorial diagram illustrating elements of a deep learning/machine learning model suitable for generating embedding vectors in accordance with aspects of the disclosed subject matter.

As mentioned above and according to various aspects of the disclosed subject matter, embedding vectors for content items may be generated from a convolution process. Typically, though not exclusively, the convolution process is carried out by a trained, deep neural network. FIG. 8 is a pictorial diagram illustrating elements of a deep learning network 800 (also referred to as a deep machine learning model) suitable for generating one or more embedding vectors, such as embedding vector 820, for one or more content items and corresponding metadata, such as content item 802, in accordance with aspects of the disclosed subject matter.

As those skilled in the art will appreciate, the deep neural network 800 comprises multiple executable layers, including an input layer 804, and output layer 816, and one or more hidden layers. By way of illustration, executable model 800 includes m hidden layers, including hidden layers 806 and 818. The input layer 804 accepts the input data (e.g., content item 802 and its metadata) for which the model 800 will generate a corresponding result (e.g., embedding vector 820).

The input layer 804 accepts the input data (in this case content item 802 and any metadata that may be associated with the content item) and, according to one or more predetermined algorithms and/or heuristics, generates a plurality of values for one or more aspects, features and/or facets from the input data. These values (not illustrated but implied by the various edges, such as edge 814, extending from the input layer 804 to the various processing nodes of the first hidden layer 806) are output of the first layer and distributed as input data to processing nodes, such as processing nodes 810 and 812, in the first of the hidden layers of the executable model 800.

Typically, though not exclusively, a value/facet of the input data passed from the input layer 804 to a first processing node in the first hidden layer, such as node 810 of hidden layer 806, is different than a value/facet passed to a second processing node of that same hidden layer, such as to node 812 of hidden layer 806.

Each hidden layer comprises a plurality of processing nodes. By way of illustration and not limitation, hidden layer 806 includes n processing nodes $N_1$-$N_n$. While the processing nodes of the first hidden layer 806 typically, though not exclusively, have a single input from the input layer, processing nodes of subsequent hidden layers typically have input values from one or more processing nodes of the previous input layer. As illustrated in executable model 800, each hidden layer (except for the first hidden layer 806) accepts input data/signals from each of the processing nodes of the prior hidden layer, as indicated by the edges proceeding from a processing node of an "upper" hidden layer (e.g., layer 806) to a "lower" hidden layer.

Each processing node implements one or more "convolutions" or "computations" on the input data it receives (whether the processing node receives a single item of input data, or plural items of input data) to produce a single output. These convolutions/computations may include any number of functions to generate the output data, such as (by way of illustration and not limitation) aggregations, clusterings, transformations, combinations, selections and/or filters, mathematical manipulations, linear and multivariate regressions, statistical determinations and predictions, and the like. Moreover, individual items of input data may be weighted such that a given item of input data plays a greater or lesser role in the overall computation of any processing node. Items of input data may be weighted in such a manner as to be ignored in convolution. Hyperparameters (data/values that are input from sources external to processing nodes of a prior input level) may also be utilized by all or some of the processing nodes of a hidden layer.

As will be appreciated by those skilled in the art, one of the interesting aspects of machine learning is that the various levels of the machine learning model are self-learning, meaning that when provided feedback, modifications are made to the weights, parameters, and processing of nodes in the various layers in order to achieve better results. Thus, except for initially established computations of the various processing nodes in a training phase of the machine learning process, a person is unlikely to have specific insight or knowledge as to the exact computations that any particular processing node of a hidden layer may utilize. Instead, during the training process of a machine learning process, the machine learning process makes its own determinations as to how to modify each computation to produce better/superior results for the input values it receives.

At the final hidden input layer, e.g., layer 818, the processing nodes provide their output data to the output layer 816. The output layer 816 performs whatever aggregations, calculations, normalizations and/or interpretations of the various items of input data to produce an output value of the model. In the illustrated example, the output layer 816 produces an embedding vector 820 for the content item 802 and corresponding metadata. According to one embodiment of the disclosed subject matter, to produce the embedding vectors of a content item, the output layer 816 aggregates each item of output data from the final hidden layer 818 as the dimension of an embedding vector.

Regarding the training of a machine learning model, and according to aspects of the disclosed subject matter, by utilizing information regarding relevant neighborhoods of target nodes to generate ever-increasing difficult training data, efficiencies can be gained in the time (reduced iterations) to train a machine learning model with additional increases in accuracy of the resulting trained model.

Figure 9:
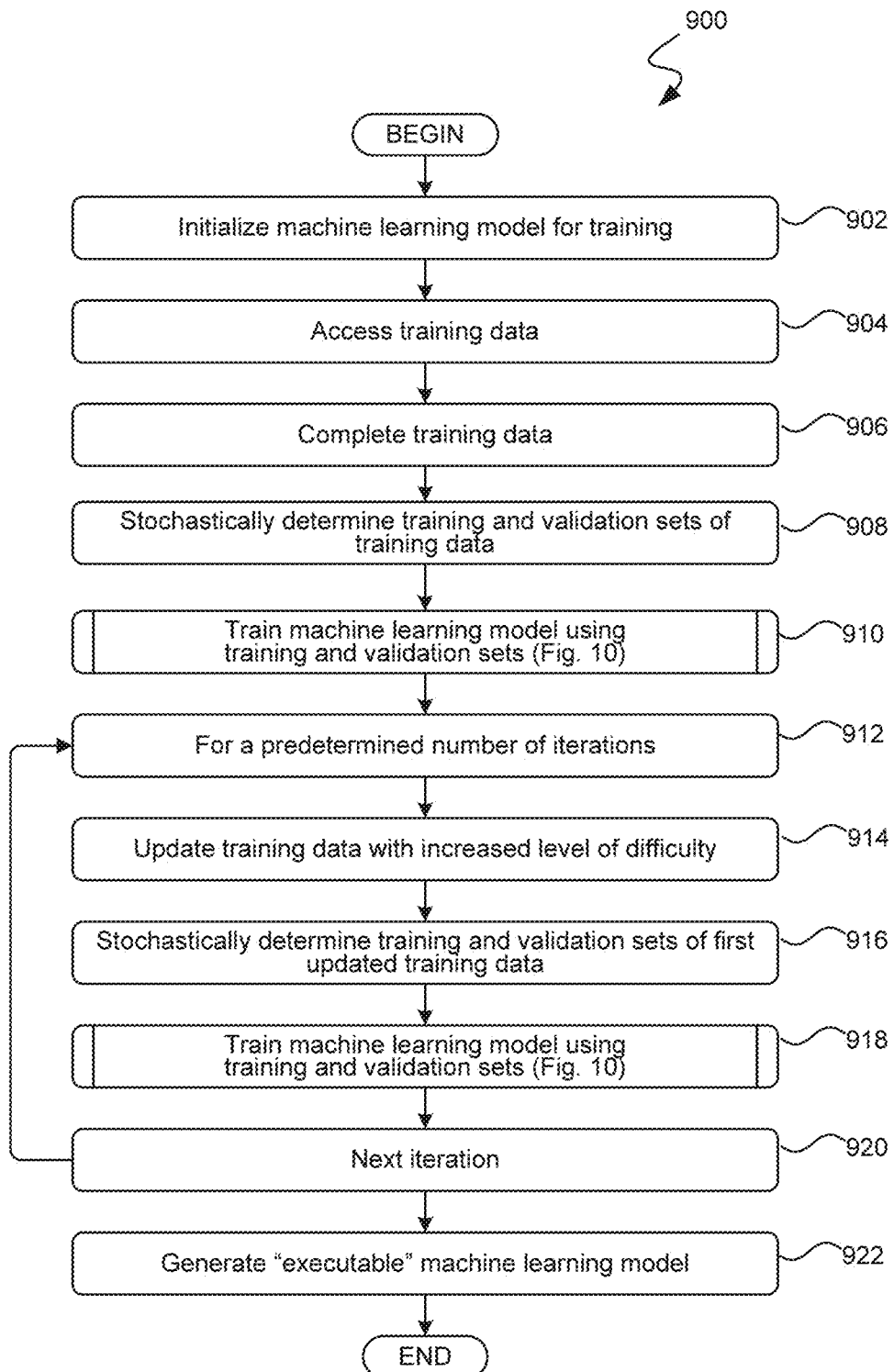
FIG. 9 is a flow diagram illustrating an exemplary routine suitable for training a machine learning model utilizing ever-increasing difficult training data in accordance with aspects of the disclosed subject matter.

FIG. 9 is a flow diagram illustrating an exemplary routine 900 suitable for training a machine learning model utilizing ever-increasing difficult training data, in accordance with aspects of the disclosed subject matter. Beginning at block 902 and as is typical in machine learning model training, the machine learning model is initialized with various convolutional routines, aggregational routines, transformational routines, hyperparameters, and the like.

At block 904, training data for training the machine learning model is accessed. As those skilled in the art will appreciate, machine learning models are trained using training data. This training data is typically curated (or organized) to include records for processing and are organized to indicate the actual/correct results. According to aspects of the disclosed subject matter, the records are triplets that include a target node, a matching node (that matches the target node), and a non-matching node. During processing, the order in which the matching and non-matching nodes are presented to the machine learning model is randomized, and the task of the machine learning model is to select between the matching and non-matching nodes as to which matches the target node. The results of the output of the machine learning model can them be compared to the information of the training record as to whether the machine learning model correctly identified the matching node.

In order to take advantage of information regarding relevant neighborhoods, this training data may be incomplete. In this regard, incomplete training data should be understood to mean training records that need additional information in order to be complete for processing by a machine learning model. Accordingly, at block 906, an optional step (in the event that the training data is incomplete) is carried out to complete the training data.

According to some embodiments of the disclosed subject matter, the incomplete training data may include a set of training records, each record including only a target node from within a corpus graph. In this embodiment, a random walk is conducted on the target node to identify the relevant neighborhood of the node. Once the relevant neighborhood is identified, the neighbor node within the relevant neighborhood having the highest relevance (as determined by visit counts) to the target node is identified and included within the record as a matching node. Additionally, a random node within the corpus graph is identified or selected and included in the training record as a non-matching node. Where the corpus graph is sufficiently large, e.g., billions of interconnected nodes, random selection of a node as a non-matching node will most likely identify a node that is not a match to the target node, especially compared to the identified matching node.

According to alternative embodiments of the disclosed subject matter, the incomplete training data may include a set of training records where each record includes both a target node and a matching node. The training records are completed by the addition of a randomly selected node from the corpus graph as a non-matching node for each of the training records. Of course, in some embodiments the training data may be complete.

Regarding this initial, complete training data, the purpose of selecting the most relevant neighbor node as a matching node for the corresponding target node, or having curated matches between the target node and matching node, and further selecting a random node as the non-matching, is to provide a relatively easy set of initial training data to process. This relatively easy training data leads to a relatively shortened training period for the machine learning model and accuracy thresholds can be held relatively high leading to improved accuracy.

At block 908, as those skilled in the art will appreciate, the training data is stochastically organized into a training set and a validation set. In this, the training data is used in training the machine learning model (as discussed above) and the validation set is used to determine the accuracy of the machine learning model once the model has achieved what is perceived to be the threshold level of accuracy in training on the training set.

Figure 10:
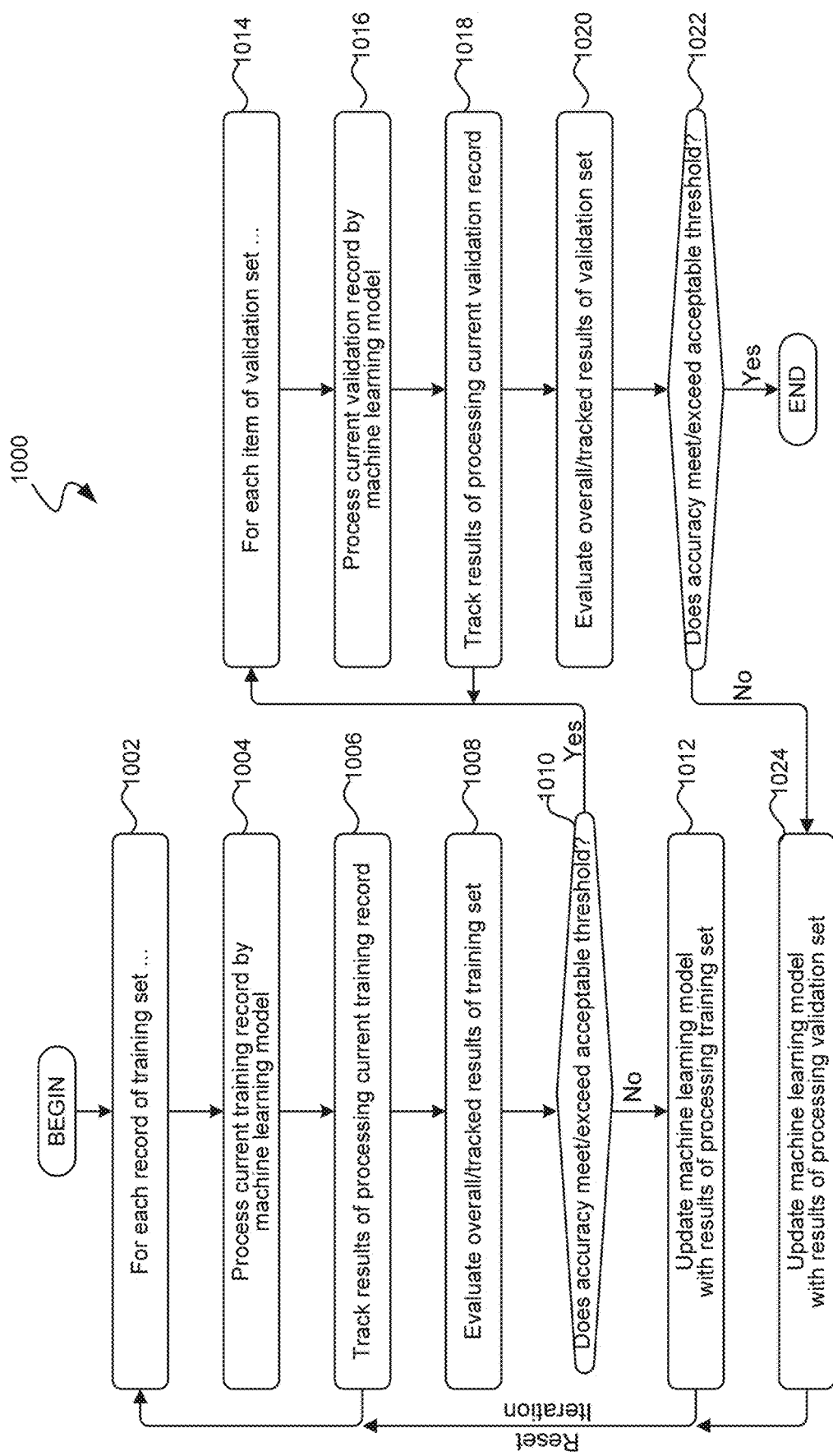
FIG. 10 is a flow diagram illustrating an exemplary routine suitable for training a machine learning model in accordance with aspects of the disclosed subject matter.

At block 910, the machine learning model is trained according to the initial training data. Training a machine learning model is described in more detail in regard to FIG. 10. Indeed, turning to FIG. 10, this figure is a flow diagram illustrating an exemplary routine 1000 suitable for training a machine learning model in accordance with aspects of the disclosed subject matter.

At block 1002, an iteration loop is begun to iterate through the training set of the training data. At block 1004, the machine learning model processes the currently iterated training record. As those skilled in the art will appreciate, processing the training record comprises providing the information to the machine learning training model where it is processed as generally described above in regard to FIG. 8. As suggested, processing may include randomizing the order of the matching and non-matching nodes to prevent the machine learning model from learning results based on the order that matching/non-matching nodes are provided.

In regard to processing the training record and particularly in regard to matching the target node to the corresponding matching node, in one embodiment this "matching" may be carried out according to embedding vectors of the three nodes. More particularly, the machine learning model matches various elements of the embedding vector of the target node against corresponding elements of the embedding vectors of the matching and non-matching nodes to determine which is the matching node. According to aspects of the disclosed subject matter, matching is determined according to the cosine similarities of the embedding vectors. In this regard, let Q be the aggregated embedding vector of the target node, M be the aggregated embedding vector of the matching node, and NM be the aggregated embedding vector of the non-matching node. A "match" is found when the cosine similarity of Q and M is greater than the cosine similarity of Q and NM plus some scalar margin d, denoted as $\cos(Q, M) > \cos(Q, NM) + d$.

As will be appreciated by those skilled in the art, the machine learning model "learns" which elements of the embedding vectors to compare, which elements are most important in matching (i.e., weights associated with various elements), based on the comparison what indicates a match (i.e., a cosine similarity function), based on the comparison, what are the likelihoods of a match between target node and the matching node, and between the target node and the non-matching node, and the like.

At block 1006, the results of processing the currently iterated training record are tracked, including recording the predicted result (by the machine learning model) in view of the items in the training record versus the actual results. This tracking, when aggregated, can be used to validate the results of the training of the machine learning model and/or provide updated information for the training of the machine learning model.

Additionally, at block 1006, if there are additional training records to process as part of the training set, the routine 1000 returns to block 1002 for processing the next training record. Alternatively, if all of the training records have been processed, the routine 1000 proceeds to block 1008.

At block 1008, the results of the machine learning model (which reflect the current state of training of the model) are evaluated in view of the actual results that should be determined if the machine learning model were trained perfectly. This evaluation/determination results in a score indicating the overall accuracy of the machine learning model (as currently trained). With this score, at decision block 1010, a determination is made whether a sufficient level of accuracy (i.e., does the score meet or exceed an acceptable threshold level) has been achieved by the machine learning model.

If the current accuracy of the machine learning model does not meet the acceptable threshold, the routine 1000 proceeds to block 1012. At block 1012, the tracked results (in view of the actual results) are used to update aspects of, or train, the machine learning model. These updates may include modifications to the various processing layers and/or to the various hyperparameters used at the various layers. After updating the machine learning model in view of the tracked results, the routine 1000 then proceeds back to block 1002 where the iteration of the training set is reset/reinitialized such that the training records are again processed by the machine learning model.

With reference to decision block 1010, if the determination is made that the results have met the acceptable threshold level, the routine 1000 proceeds to block 1014. At block 1014, an iteration loop is begun to iterate through the validation records in the validation set. This iteration of validation records is to now validate that the machine learning model hasn't simply learned the pattern among the training records of the training set, but has actually achieved a satisfactory/acceptable level of accuracy. As those skilled in the art will appreciate, it is not uncommon for the machine learning model, in the course of being trained, to generate acceptable results (threshold level of accuracy) on a training set only to fail to achieve that acceptable level with a validation set.

At block 1016, the currently iterated validation record of the validation set is processed by the machine learning model, which may include randomizing the input order of the matching/non-matching nodes. At block 1018, the result of the processing is tracked and, if there are additional validation elements to process, the routine 1000 returns to block 1014. Alternatively, if there are no additional validation records to process, the routine proceeds to block 1020.

At block 1020, the results of processing the validation set by the machine learning model (which reflect the current state of training of the model) are evaluated in view of the actual, previously known results that should be determined if the machine learning model were trained perfectly. This evaluation/determination results in a score indicating the overall accuracy of the machine learning model (as currently trained). With this score, at decision block 1022, a determination is made whether a sufficient level of accuracy (i.e., does the score meet or exceed an acceptable threshold level) has been achieved by the machine learning model.

If, at decision block 1022, the accuracy threshold is not met, the routine 1000 proceeds to block 1024. At block 1024, the tracked results (in view of the actual results) are used to update aspects of, or train, the machine learning model. As mentioned above, these updates may include modifications to the various processing layers and/or to the various hyperparameters used at the various layers. After updating the machine learning model in view of the tracked results of the validation set, the routine 1000 then proceeds back to block 1002 to begin the entire process, starting with the training set, where the iteration of the training set is reset/reinitialized such that the training records are again processed by the machine learning model, and to subsequently process the validation set as well.

With reference again to decision block 1022, if the results of the validation set are determined to meet or exceed an acceptable tolerance, the routine 1000 terminates, having sufficiently trained the machine learning model to acceptable levels of accuracy.

Returning again to FIG. 9, after having trained the machine learning model on the initial training data in block 910, the routine 900 proceeds to block 912.

As indicated above, aspects of the disclosed subject matter include training the machine learning model on ever-increasing difficult sets of training data. At block 912, an iteration loop is begun to carry out the repetition of training and increasing the level of difficulty in the training data. In one embodiment, this iteration is carried out (2) times, though any number of iterations may be used. Additionally, while the subsequent discussion of generating an increased difficult set of training data is made in the context of the initial set of training data, each level of difficulty can utilize a newly generated set of training data.

With the current iteration, the routine 900 proceeds to block 914. At block 914, the training data is updated to an increased level of difficulty. There are several strategies that can be used to increase the level of difficulty for training data (based on the initial training data) that include the random walk. In each, a random walk is performed on the target node to identify a relevant neighborhood for the target node. This random walk may be modified to allow the selection of neighborhood nodes to extend further from the target node (i.e., determination to reset is decreased in likelihood), to include neighborhood nodes with visit counts that fall below some threshold amount to be included, and/or not truncate the number of neighbor nodes that can be included in the neighborhood. With or without this expanded relevant neighborhood, one option/strategy is to access the relevant neighborhood and replace the non-matching node with a node from the relevant neighborhood that is less distant to the target node, where this distance is a function of the number of iterations conducted, such that in each successive iteration the non-matching node is closer (higher visit counts) to the target node than the un-updated non-matching node. Another option is to replace the matching node with a node from the relevant neighborhood that is less close to the target node, where "less close" is a function of the number of visit counts. In this regard, the updated matching node is further (few visit counts) from the target node than the matching node it is replacing. Yet another option or strategy is to replace both the matching and non-matching nodes. In all of these, there is a limit that the matching node is not further distant (fewer visit counts) to the target node than the non-matching node.

After having updated the training data, at block 916 the updated training data is stochastically divided into sets: a training set and a validation set. Thereafter, at block 918 the machine learning model is further trained on the updated training data, as described above in regard to routine 1000 of FIG. 10. Once the machine learning model has been trained on the updated training data, at block 920 if there are additional iterations to perform the routine 900 returns to block 912 to continue the iteration loop of training the machine learning model on increasingly-difficult training data. Alternatively, if the predetermined iterations have been performed, the routine 900 proceeds to block 922.

At block 922, an executable, optimized version of the now-trained machine learning model is generated. Thereafter, the routine 900 terminates.

Regarding routines 200, 300, 500, 900, 1000 and 1700 described above, as well as other routines and/or processes described or suggested herein including routines 1300 and 1500, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Optimizations of routines may be carried out. Those skilled in the art will recognize that the logical presentation of steps is sufficiently instructive to carry out aspects of the claimed subject matter irrespective of any particular development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Accordingly, the particular use of programming and/or implementation techniques and tools to implement a particular functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 11 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 11:
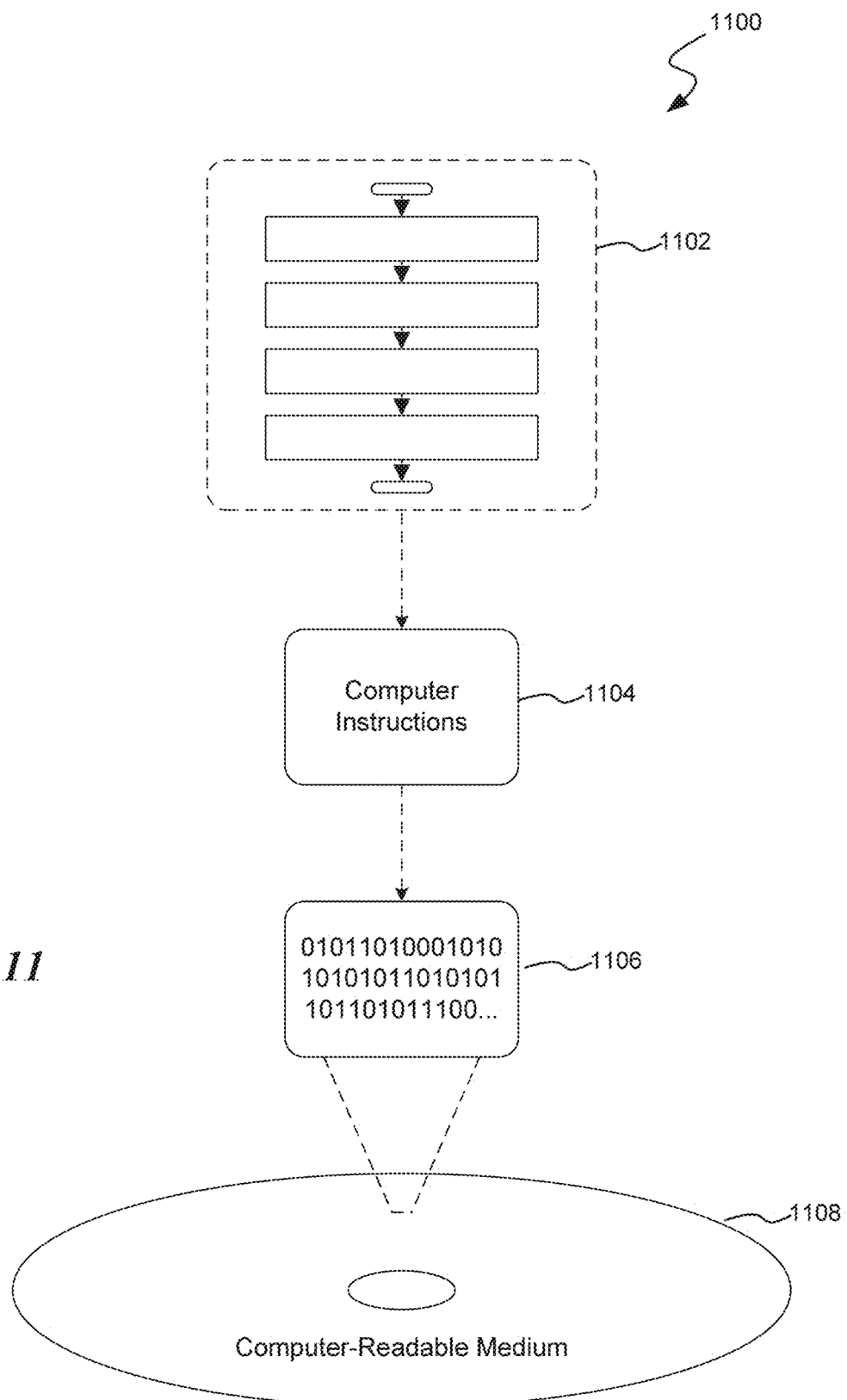
FIG. 11 is a block diagram illustrating an exemplary computer readable medium encoded with instructions for determining an aggregated embedding vector for a target node as described in regard to routines disclosed herein.

Regarding computer readable media, FIG. 11 is a block diagram illustrating an exemplary computer readable medium encoded with instructions for determining an aggregated embedding vector for a target node as described in regard to routines and processes disclosed above. More particularly, the implementation 1100 comprises a computer-readable medium 1108 (e.g., a CD-R, DVD-R or a platter of a hard disk drive), on which is encoded computer-readable data 1106. This computer-readable data 1106 in turn comprises a set of computer instructions 1104 configured to operate according to one or more of the principles set forth herein. In one such embodiment 1102, the processor-executable instructions 1104 may be configured to perform a method, such as at least some of exemplary routines 200, 300 and 500, for example. In another such embodiment, the processor-executable instructions 1104 may be configured to implement a system on a computing device, such as at least some of the exemplary, executable components of computing device 1200 of FIG. 12, as described below. Many such computer readable media may be devised, by those of ordinary skill in the art, which are configured to operate in accordance with the techniques presented herein.

Figure 12:
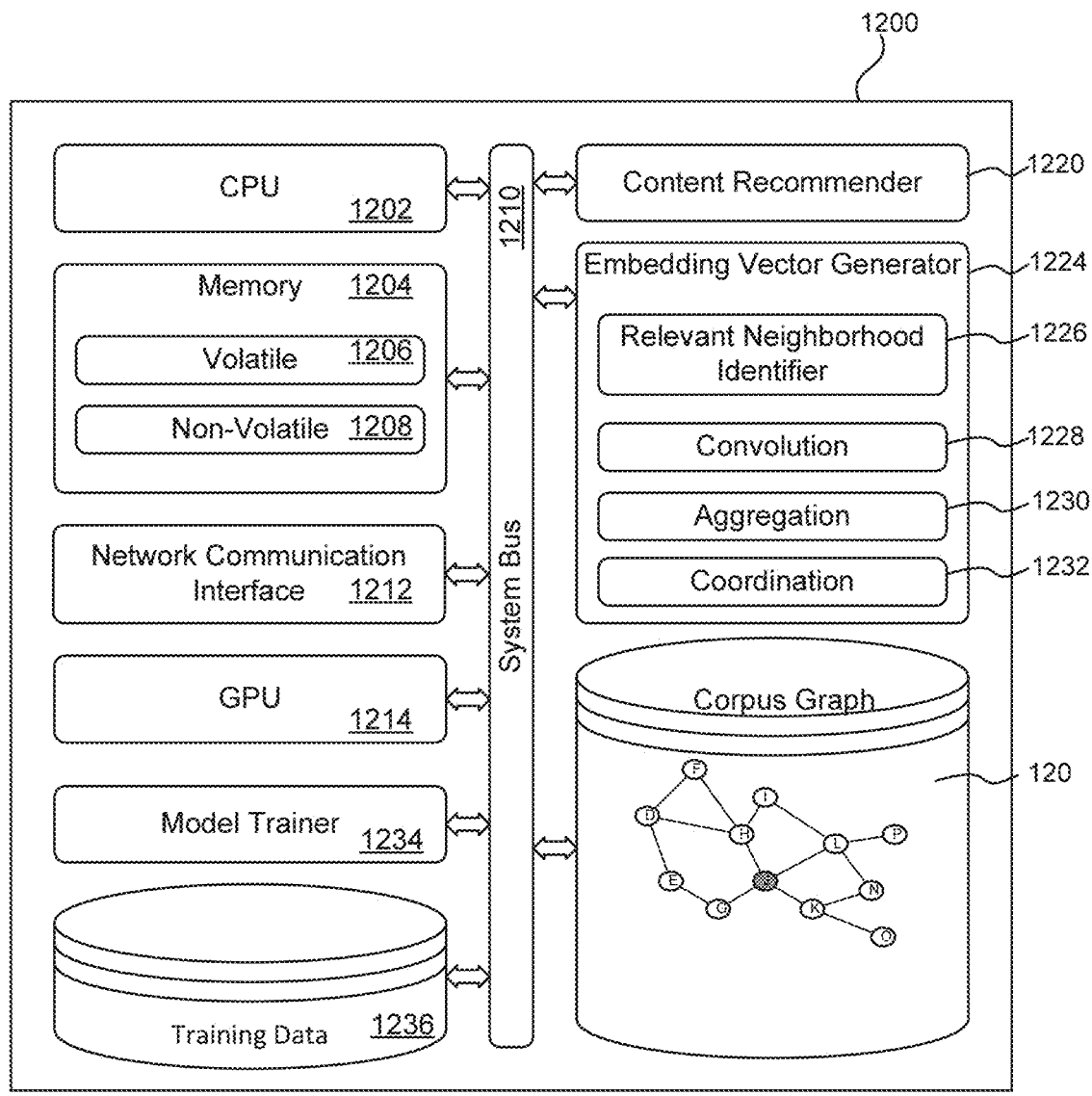
FIG. 12 is a block diagram illustrating an exemplary computing system (or computing device) suitably configured for implementing a content recommender system in accordance with aspects of the disclosed subject matter.

Turning now to FIG. 12, FIG. 12 is a block diagram illustrating an exemplary computing system 1200 (or computing device) suitably configured for implementing a content recommender system in accordance with aspects of the disclosed subject matter. The computing system 1200 typically includes one or more central processing units (or CPUs), such as CPU 1202, and further includes at least one memory 1204. The CPU 1202 and memory 1204, as well as other components of the computing system, are interconnected by way of a system bus 1210.

As will be appreciated by those skilled in the art, the memory 1204 typically (but not always) comprises both volatile memory 1206 and non-volatile memory 1208. Volatile memory 1206 retains or stores information so long as the memory is supplied with power. In contrast, non-volatile memory 1208 is capable of storing (or persisting) information even when a power supply is not available. Generally speaking, RAM and CPU cache memory are examples of volatile memory 1206 whereas ROM, solid-state memory devices, memory storage devices, and/or memory cards are examples of non-volatile memory 1208.

As will be further appreciated by those skilled in the art, the CPU 1202 executes instructions retrieved from the memory 1204, from computer readable media, such as computer readable media 1108 of FIG. 11, and/or other executable components in carrying out the various functions of recommending likely digital content items for a content collection. The CPU 1202 may be comprised of any of a number of available processors such as single-processor, multi-processor, single-core units, and multi-core units, which are well known in the art.

Figure 14:
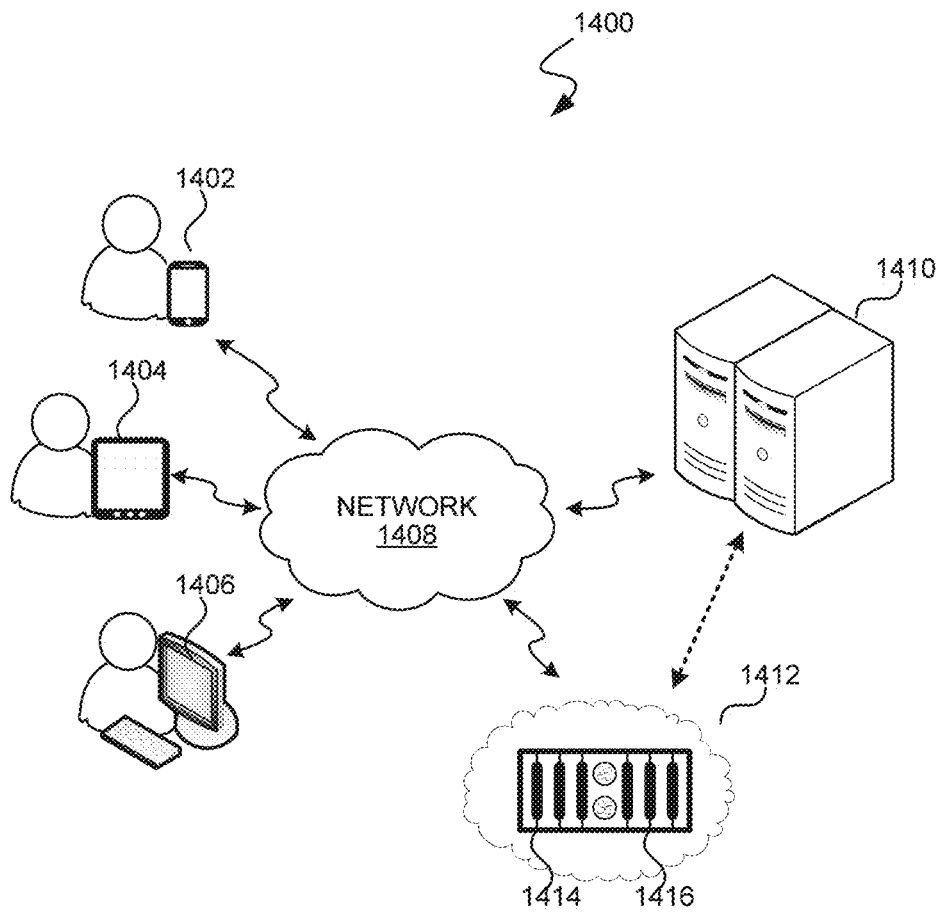
FIG. 14 is a block diagram illustrating an exemplary network environment suitable for implementing aspects of the disclosed subject matter.

Further still, the illustrated computing system 1200 typically also includes a network communication interface 1212 for interconnecting this computing system with other devices, computers and/or services over a computer network, such as network 1408 of FIG. 14. The network communication interface 1212, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 1212, is typically comprised of hardware and/or firmware components (and may also include or comprise executable software components) that transmit and receive digital and/or analog signals over a transmission medium (i.e., the network).

The illustrated computing system 1200 also includes a graphics processing unit (GPU) 1214. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied convolution processes of a machine learning model/neural network that manipulate large amounts of data, as described above in regard to FIG. 8. Indeed, one or more GPUs, such as GPU 1214, are viewed as essential processing components when conducting machine learning technique. Also, and according to various embodiments, while GPUs are often included in computing systems and available for processing convolutions of machine learning models, such as GPU 1214 of computing system 1200, multiple GPUs are also often deployed as online GPU services or farms and machine learning processing are advantageously directed to conducting the various layers/convolutions of a neural network as described in regard to the exemplary network environment 1400 of FIG. 14.

The computing system 1200 further includes an executable content recommender component 1220. In execution on the computing system 1200, the content recommender component 1220 operates in a similar manner to that described in regard to routine 1300 below. Indeed, the content recommender component 1220 receives a query from a user over a network, such as network 1408, identifies the content item (or a closely matching content item) in a corpus graph 100, identifies potential recommendations for the user, and provides at least one recommendation of the potential recommendations to the user.

Also included in the computing system 1200 is an executable embedding vector generator 1224. In execution on the computing system 1200, the embedding vector generator 1224 is configured to generate aggregated embedding vectors for one or more nodes in the corpus graph 100, as describe above in regard to the various routines 200, 300 and 500. The embedding vector generator 1224 includes one or more executable convolution modules 1228 that operate to convolve or generate various embedding vectors for nodes in the corpus graph in the course of generating an aggregated embedding vector for a given target node. Similarly, the embedding vector generator 1224 includes one or more executable aggregation modules 1230, as set forth and described above in regard to routine 500 of FIG. 5.

As mentioned above, machine learning models comprising multiple layers of processing are best performed by GPUs, such as GPU 1214, rather than central processing units (CPUs), such as CPU 1202. Indeed, GPUs are specifically designed to manipulate large amounts of memory and perform floating point operations on a faster and larger scale than are CPUs. This is significant when processing large data sets comprising data-rich items of content, such as images. Indeed, the abilities of the GPU allow the machine learning models to solve linear algebra equations, conduct statistical analysis, regressions, and the like in an efficient and speedy manner, especially when compared to that same work on a CPU. On the other hand, while GPUs excel in processing floating point operations and manipulating large amounts of memory, CPUs can be effectively and efficiently directed to identifying the information and/or data that one or more GPUs should process.

According to aspects of the disclosed subject matter, the exemplary computing system 1200 further includes an executable coordination module 1232. This coordination module 1232 operates to efficiently and advantageously divide the tasks of generation of aggregated embedding vectors between processors, such as CPU 1202, and GPUs, such as GPU 1214. Indeed, according to aspects of the disclosed subject matter, the coordination module 1232 directs tasks such as identifying relevant neighborhoods of a target node to one or more CPUs, such as CPU 1202, while tasks corresponding to machine learning are directed to one or more GPUs, such as GPU 1214.

According to aspects of the disclosed subject matter, the coordination module 1232 directs the activities of the relevant neighborhood identifier 1226 to operate on one or more CPUs, such as CPU 1202, and directs the activities of the convolution module 1228 and the aggregation module 1230, to one or more GPUs, such as GPU 1214. The coordination module 1232 further coordinates between the two: identifying, marshaling and organizing relevant neighborhood information of a target node (including information corresponding to the nodes of the relevant neighborhood) by the relevant neighborhood identifier 1226 implemented on one or more CPUs, and providing that information to the convolution module 1228 and aggregation 1230 modules implemented on one or more GPUs. While the coordination module may be an executable module, with execution independent of the CPU 1202, in various embodiments, the coordination module 1232 may be implemented for execution by or in conjunction with the CPU 1202.

Also shown in the exemplary computing system 1200 is an executable model trainer component 1234 and a body of training data 1236. As suggested above in regard to routines 900 and 1000, and according to aspects of the disclosed subject matter, the model trainer 1234 is configured to efficiently and accurately train a deep neural network/machine learning model using an iterative process where the training data is, at each level after the initial set of training data, more difficult for the machine learning model to process. More particularly, for each subsequent iteration of training, the difficulty of the training data is increased in a manner that differentiating between a matching node and a non-matching is more challenging. In accordance with aspects of the disclosed subject matter, the model trainer 1234 utilizes the relevant neighborhoods of the target nodes in the training data 1236 (which is comprised of training records, each record including a target node, a corresponding matching node, and a corresponding non-matching node) to update the difficulty of the training data. Advantageously, using this structured approach to training the machine learning model, i.e., iteratively training the machine learning model using ever-increasingly difficult training data, accuracy of the fully trained machine learning model is greatly enhanced and the speed at which the machine learning model becomes fully trained is significantly reduced.

Figure 13:
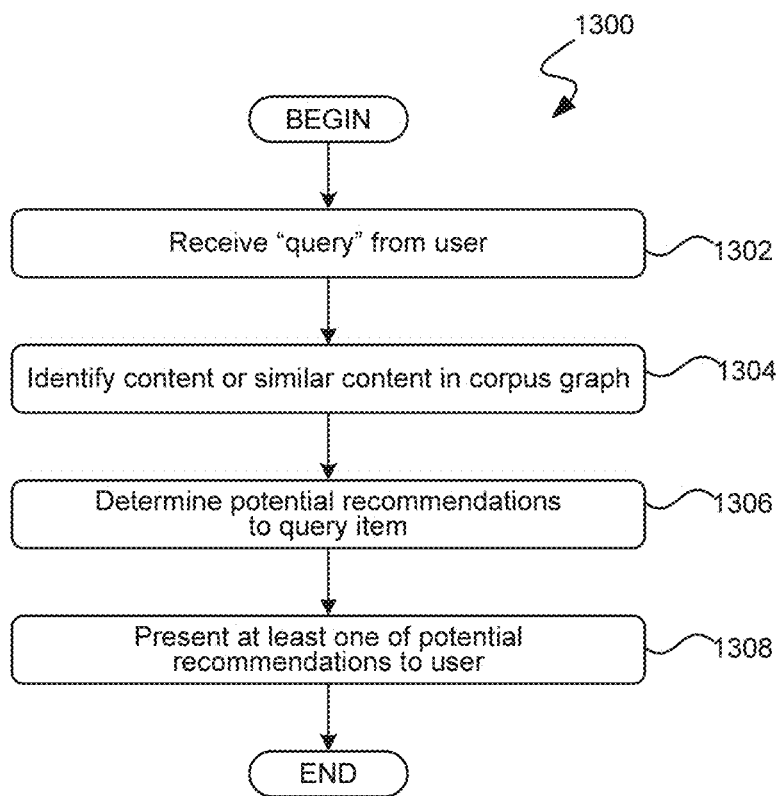
FIG. 13 is a flow diagram illustrating an exemplary recommender routine for responding with content recommendations to receiving a query.

Turning to FIG. 13, FIG. 13 is a flow diagram illustrating an exemplary routine 1300 of a recommender system for responding to a query from a user, and in accordance with various aspects of the disclosed subject matter. Beginning at block 1302, the recommender system, such as recommender system 1410 of FIG. 14, receives a query from a user. As indicated above, the term query refers to content from a user for which one or more recommendations of content are to be made. A "query" may be generated by a computer user by interaction with a content item and not necessarily through direct intention to request additional content.

At block 1304, the recommender system identifies the received content item or a similar content item in the corpus graph, such as corpus graph 100. In identifying the content item or similar content item, at block 1304 an embedding vector may be generated for the received content item to facilitate matching of the received content item to an item in the corpus graph. In the case of finding a similar content item in the corpus graph, matching using various techniques. In one embodiment, locality sensitive hashing (LSH) techniques are used to identify similar and/or matching content. Other matching techniques can also, or alternatively, be used, such as K-means clustering to locate one or more similar content items/nodes in the corpus graph.

At block 1306, after having identified either the content item in the corpus graph, or a close match in the corpus graph, an evaluation of the aggregated embedding vector of the item of the corpus graph is used to find near matches, again using clustering and matching techniques that are known in the art.

At block 1308, from the set of near matching, at least one potential near match is provided to the user as a recommendation to the user. Thereafter, the routine 1300 terminates.

Turning to FIG. 14, FIG. 14 is a block diagram illustrating an exemplary network environment 1400 suitable for implementing aspects of the disclosed subject matter. In particular the network environment includes one or more computer users operating via computing devices, such as computing devices 1402-1406, for connecting over a network 1408 with other online services, such as recommender service 1410. As will be appreciated by those skilled in the art, the user computers may comprise any of a variety of computing devices such as, by way of illustration and not limitation, tablet computers (such as tablet computer 1404), laptop computers, desktop computers (such as desktop computer 1406), smart phones (such as smart phone 1402), and the like.

The user computers 1402-1406 communicate with other computers and/or devices over one or more networks, such as network 1408. As will be appreciated by those skilled in the art, the network 1408 is a telecommunication network over which computing devices and network enabled processes and/or services may communicate and/or exchange data. By way of illustration, a computer network such as network 1408 may comprise any of a local area network or LAN, a wide area network or WAN, or combinations of the two. According to various embodiments of the disclosed subject matter, the network 1408 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and optical networking technologies. According to aspects of the disclosed subject matter, the personal computing devices, including user computing devices 1402-1406, can communicate with the network 1408 by way of a wired connection, a wireless connection, an optical connection, or any combination of these.

Also included in the exemplary network environment 1400 is an online recommender service 1410 on a network computing system. As described above, the online recommender service 1410 is configured to receive a query from a computer user over the network 1408 and, in response, provide one or more recommendations of content relevant to the query item to the user.

As illustrated in the exemplary network environment 1400, and in accordance with aspects of the disclosed subject matter, the recommender service 1410 may utilize local, tightly coupled, and/or remote cloud-based GPU clusters, such as cloud-based GPU cluster 1412 that comprises one or more GPUs, such as GPUs 1414 and 1416. As discussed above and in accordance with aspects of the disclosed subject matter, directing the convolution of node data and relevant neighborhood information into aggregated embedding vectors may be advantageously implemented on one or more GPUs, while identifying the relevant neighborhood nodes of a target node, marshalling, organizing the data may be advantageously implemented on one or more CPUs. As suggested above, the GPU cluster 1412 may be implemented and maintained by the recommender service 1410. Alternatively, and as shown in the exemplary network environment 1400, the GPU cluster 1412 may be implemented as an online service accessible to the recommender service 1410.

With regard to the processing by the GPU cluster 1412, and many other processes, it should be appreciated that the operations of these processes are often conducted in an offline, batch mode. Indeed, processing items through a GPU-cluster (e.g., configured to implement MapReduce functionality) are made in an offline manner to produce a data set of pre-processed content that can be used by the recommender service 1410 to identify matches or similar content in to a user request in an on-demand manner.

Figure 15:
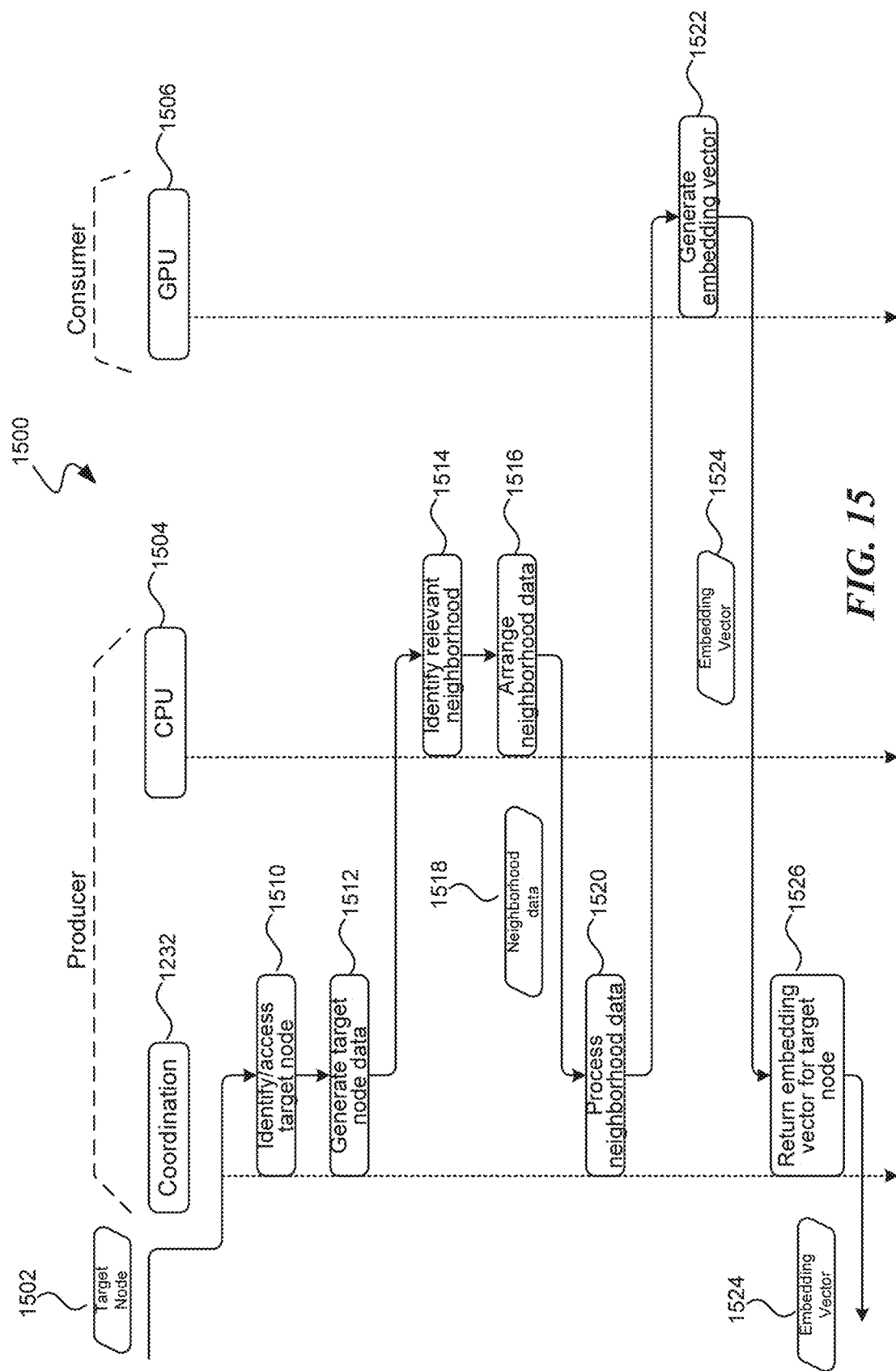
FIG. 15 is a block diagram illustrating exemplary, logical processing distributed between producers and consumers in accordance with aspects of the disclosed subject matter.

With regard to the allocation of duties between one or more CPUs and one or more GPUs, reference is made to FIG. 15. FIG. 15 is a block diagram illustrating exemplary, logical processing 1500 distributed between a coordination component 1232, at least one CPU 1504 and at least one GPU 1506, in accordance with aspects of the disclosed subject matter. As illustrated in FIG. 15 the efforts of the coordination component 1232 and the one or more CPUs, such as CPU 1504, are considered the producer side of a producer/consumer relationship in which the producer side produces information (relevant neighborhood data) for a target node and the consumer side (the one or more GPUs) consumes the data, thereby generating an aggregated neighborhood embedding vector for the target node.

In the exemplary process of FIG. 15, a coordination component 1232 receives information regarding a target note 1502 for which an embedding vector is requested. In response and in accordance with aspects of the disclosed subject matter, the coordination component appropriately allocates tasks to the one or more CPUs (such as CPU 1502 and/or CPU 1202 of FIG. 12) that generates data for processing by the one or more GPUs (such as GPU 1506 and/or GPU 1214 of FIG. 12). In both instances, the CPU 1504 or the GPU 1506 may be part of the computing device upon which the coordination component 1232 is operating. In the alternative, either the CPU 1504 and/or the GPU 1506 may be part of other, coordinating systems, and/or part of one or more CPU clusters or GPU clusters that are available as services over a network 1408.

As part of allocating tasks among CPUs (producers) and GPUs (consumers), the coordination component 1232 at step 1510 identifies/accesses the target node and any data associated with the target node. This may include accessing the target node/content item, as well as metadata associated with the target node. At step 1512, the coordination component generates target node data (organized data regarding the target node as accessing in step 1510) that will be used by the CPU 1504 and/or GPU 1506 in processing (jointly) an aggregated embedding vector for the target node.

With the target node's data generated, the coordination component 1232 then initiates processing by the CPU, comprising steps 1514 and 1516. At step 1514, the CPU 1504 identifies the relevant neighborhood for the target node. As described above, routine 300 of FIG. 3 sets forth various steps in identifying a relevant neighborhood for a target node. As will be appreciated, identifying the relevant neighborhood for the target node also includes identifying the relevant neighborhoods for the various neighboring nodes, as discussed above in regard to FIGS. 4A-4F. At step 1516, the neighborhood data is then arranged for processing by the GPU 1506.

According to aspects of the disclosed subject matter, the relevant neighborhood data, generated and arranged by the CPU 1504, is logically returned to the coordination component 1232. In response, at step 1520 the coordination component processes the neighborhood data 1518 for submission to the GPU 1506. According to aspects of the disclosed subject matter, this processing includes fixing the number of neighbors of the target node to a predetermined number (as well as fixing the number of neighbors of the neighbor nodes to that same predetermined number.) This further includes setting up the fixed neighborhood data for processing by the GPU 1506.

Fixing the number of neighbors of a particular target node facilitates the convolution process, i.e., the consumer side of processing implemented by the GPU, in generating the aggregated embedding vector for the target node to operate in an efficient manner. More particularly, since the advantages of the GPU are realized in manipulating large amounts of data, particularly large amounts of floating point data, processing neighborhood information to identify how many neighbors must be processed for each node causes substantial inefficiencies when performed on the GPU. Instead, the coordination component 1232 (typically operating on a CPU—whether or not it is CPU 1504 that identifies the relevant neighborhood) processes the neighborhood data to place the data in fixed sized data sets. For example and with reference again to FIGS. 4A-4F, assuming that the target node is Node J, the relevant neighborhood data would result in the following information:

RN(J)={G, H, I, L, P};
RN(G)={E, J, Q, S};
RN(H)={D, F, I};
RN(I)={D, F, H, J, L};
RN(L)={H, I, J, N, P. U}; and
RN(P)={A, B, L, U}.

As can be seen, the sizes of the relevant neighboring nodes (i.e., the number of "relevant neighbors"), is not the same, e.g., target Node J having 4 relevant neighbors, Node H having 3 relevant neighbors, and Node L having 6 relevant neighbors. It should be appreciated that these relevant neighbors are not necessarily immediate neighbors in the corpus graph, but rather the relevant neighbors of the corresponding target node as determined by the random walk discussed above.

Rather than offloading the processing to the GPU 1506 (or GPU cluster), the coordination cluster truncates the number of neighbors for each node to a fixed number T. By way of illustration, in one embodiment this fixed number T is set to 50. In an alternative embodiment, the number T is set to 100. Where a node has T number of neighbors, no modification is needed. However, for nodes that have too many neighbors identified, the number (for processing by the GPU 1506) is truncated to T. Selection among the nodes (which are truncated) may be made according to the importance of the neighbor to the node as determined by the number of visits to the neighbor that were made during the random walk selection. Where there are too few neighbors, in one embodiment null neighbors are included, padding the number of neighbors for a node up to the fixed amount, T. In an alternative embodiment, the number of nodes that are available is passed so that, if there are fewer than the fixed number T, the GPU can process the passed data such that only actual neighbor node information is processed. Ideally, the fixed amount T is selected such that it is most likely that padding will occur infrequently. Once the data is processed into fixed sets of data, it is passed to the GPU 1506.

At step 1522, the convolutions of the neighborhood data, along with the target node's data, are carried out, as described above in regard to routine 500 of FIG. 5. These convolutions include (as suggested above) an embedding vector for the target and neighborhood nodes, as well as aggregated embedding vectors. The convolutions in generating these embedding vectors, are carried out by a machine learning, deep neural network (such as the neural network 800 of FIG. 8), to produce an aggregated embedding vector 1524 for the target node 1502. Because the neighborhood data is comprised of fixed sized records (and a fixed number of these records), this processing is focused on the strength of the GPU 1506. After generating the aggregated embedding vector, at step 1526, the aggregated embedding vector 1524 is returned to the caller/requester.

It should be appreciated that the processing by the CPU 1504 (or by a cluster of CPUs) and the processing by the GPU 1506 (or a cluster of GPUs) may be conducted either synchronously or asynchronously to each other. In regard to asynchronous operation, and as those skilled in the art will appreciate, the coordination component 1232 may begin processing more than one target node without pausing for the completion of the tasks allocated to the CPU and/or the tasks allocated to the GPU. In concept, these elements, the coordination component 1232, the CPU 1504 and the GPU 1506, may operate as independent objects that respond to messages and return their results to their caller. Indeed, the coordination component operates to associate an aggregated embedding vector with a target node upon completion by the GPU 1506. Asynchronously, the coordination component 1232 may be carry out the coordination between CPU 1504 and GPU 1506 with regard to requests for aggregated embedding vectors of multiple target nodes within the corpus graph. In this manner, when the CPU 1504 has completed its identification of relevant neighborhood data for a given target node, a corresponding message is returned to the coordination component 1232. In response, the coordination component causes additional processing by the GPU 1506 to generate the aggregated embedding vector for the given target node. Similarly and asynchronously, when the GPU 1506 has completed generating an aggregated embedding vector for a corresponding target node (according to neighborhood data), the coordination component is notified.

Figure 16:
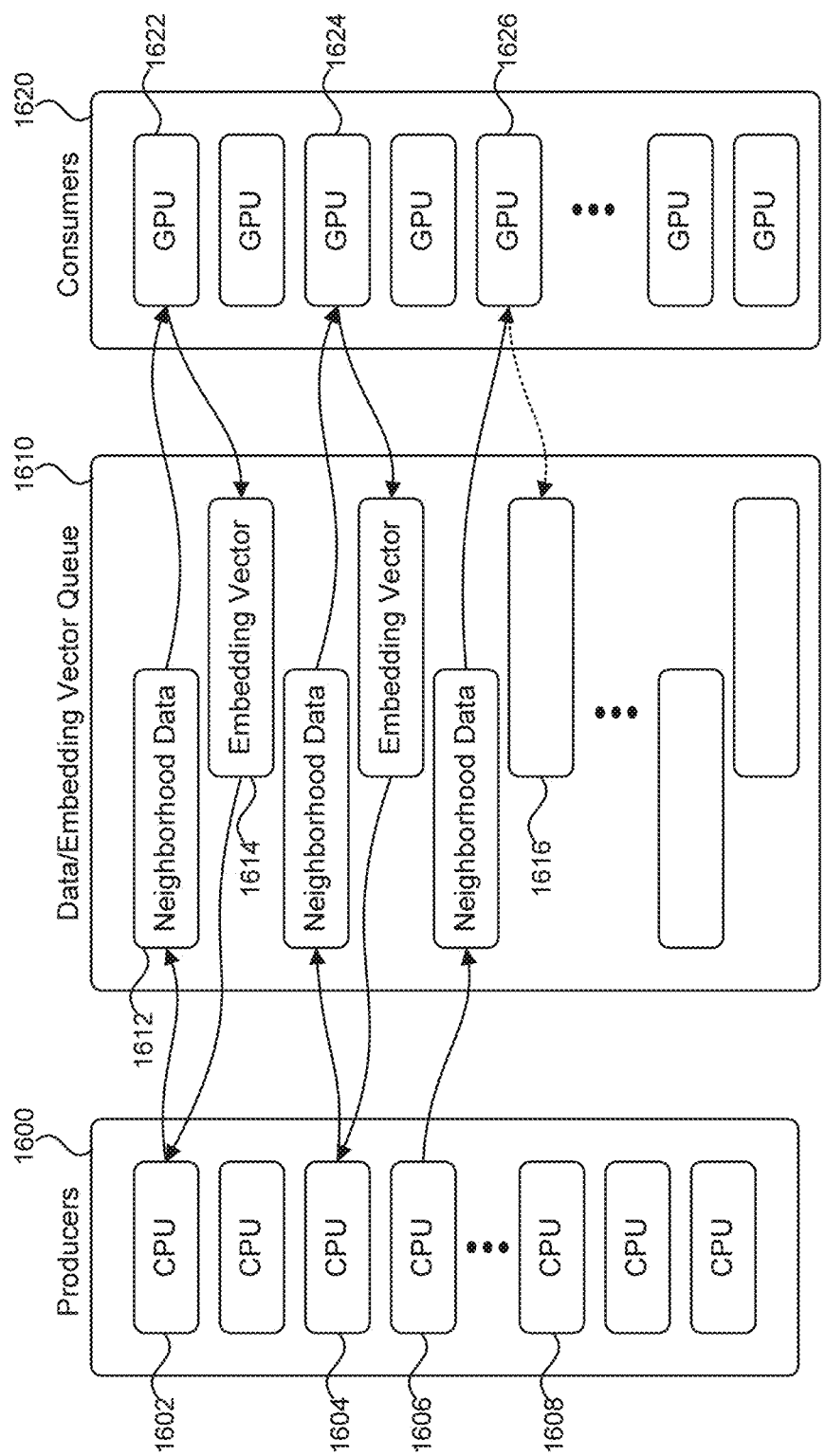
FIG. 16 is a block diagram illustrating the exemplary exchange between a family of producers and consumers by way of neighborhood data/embedding vector queue, in accordance with aspects of the disclosed subject matter.

To further illustrate the asynchronous execution of components, particularly between "producer" CPUs and "consumer" GPUs, reference is now made to FIG. 16. FIG. 16 is a block diagram illustrating the exemplary exchange between a family of producers and consumers by way of neighborhood data/embedding vector queue, in accordance with aspects of the disclosed subject matter. As indicated above in regard to FIG. 15, one or more CPUs, such as CPUs 1602-1608 (which are viewed as producers 1600) operate with one or more coordination components 1232 to generate neighborhood data. In an asynchronous manner, once neighborhood data is generated, the data is placed in a data/embedding vector queue 1610 that is accessible to both the one or more CPUs and one or more "consumer" GPUs, such as GPUs 1622-1626. Indeed, in response to receiving data from a coordination component 1232, a CPU such as CPU 1602 will prepare the neighborhood data for a node and place the prepared neighborhood data in an open slot within the data/embedding vector queue 1610, e.g., data slot 1612. Operating a queue between asynchronous entities is a known process not discussed here. On the consumer side, a process monitors for new entries in the data/embedding vector queue 1610 and, upon detecting a new entry, allocates the neighborhood data to an available GPU among the consumers 1620. For example, upon receiving an indication that there is neighborhood data in data slot 1612, GPU 1622 may be assigned to process that neighborhood data.

For its part, when a GPU completes the processing of neighborhood data, the resulting embedding vector is placed in the corresponding embedding vector slot. In continuation of the example above, after GPU 1622 completes the processing of the neighborhood data, the resulting aggregated embedding vector is placed in the corresponding embedding vector slot 1614. At this point, GPU 1622 is again free to be assigned to process additional neighborhood data.

When, on the producer side, it is detected that a corresponding embedding vector has been generated and placed in its corresponding embedding vector slot, a CPU (typically but not exclusively the one that added the neighborhood data to the data/embedding vector queue 1610 or a coordination module 1232) will access the aggregated embedding vector generated by a consumer GPU and associate the embedding vector with the source node. In continuance of the example above, the consumer GPU 1622 returns an aggregated embedding vector to embedding vector slot 1614 and, asynchronously, CPU 1602 identifies that the embedding vector has been generated, retrieves the embedding vector from the embedding vector slot, and associates the embedding vector with the source node. As can be further seen in FIG. 16, producer CPU 1606 has "produced" neighborhood data for a given token and placed the information in a data slot. Correspondingly, consumer GPU 1626 is processing the neighborhood data for the given token but has yet to complete the task of generating the aggregated embedding vector and placing the generated vector in the embedding vector slot 1616.

As can be seen, there may be multiple producer CPUs (and producer coordination modules) as producers 1600 and multiple GPUs as consumers 1620 that operate with regard to one or more data/embedding vector queues, such as data/embedding vector queue 1610. In this manner, each side (producers and consumers) can operate asynchronously, allowing individual elements of each side to operate at maximum capacity without operating as a block on the generation of aggregated embedding vectors for nodes/content items with a corpus of nodes/items.

CPUs can continue working once data is sent to the queue. They simply take the "next" slot in the queue and asynchronously monitor for the corresponding embedding vector.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method, comprising:
   under the control of one or more processors executing on a computer system:
   maintaining, in a data store, a corpus graph comprising a first plurality of nodes;
   conducting a random walk process among the first plurality of nodes originating with a target node and resulting in a subset of nodes of the first plurality of nodes, wherein each node of the subset of nodes is associated with an importance value to the target node according to a visit count to the respective node during the random walk process;
   determining a relevant neighborhood for the target node comprising a second plurality of nodes of the subset of nodes having highest associated importance values;
   generating neighborhood embedding information for the target node, the neighborhood embedding information comprising a plurality of embedding elements, each embedding element determined according to an embedding vector of a node of the relevant neighborhood and as a function of the associated importance value of the node to the target node;

storing the neighborhood embedding information in the data store in association with the target node; and in response to determining that a query corresponds to the target node, providing at least one item of content corresponding to at least one node as responsive to the query, the at least one node determined based at least in part on the neighborhood embedding information.

2. The computer-implemented method of claim 1, wherein generating the neighborhood embedding information for the target node comprises:

for each element of the neighborhood embedding information:
selecting a node of the relevant neighborhood; and
selecting an embedding element of an embedding vector of the selected node as a current embedding element of the neighborhood embedding information.

3. The computer-implemented method of claim 2, wherein selecting a node of the relevant neighborhood comprises selecting a node of the relevant neighborhood according to the importance values of the nodes of the relevant neighborhood.

4. The computer-implemented method of claim 1, wherein the relevant neighborhood for the target node includes up to a predetermined number of nodes.

5. The computer-implemented method of claim 1, wherein the second plurality of nodes comprises nodes of the subset of nodes having the highest associated importance values greater than a predetermined threshold value.

6. The computer-implemented method of claim 1, further comprising:

combining the embedding elements of the neighborhood embedding information with an embedding vector of the target node to form an aggregated embedding vector for the target node; and
storing the aggregated embedding vector in the data store in association with the target node.

7. The computer-implemented method of claim 1, wherein the nodes of the relevant neighborhood are further determined, at least in part, according to a frequency of relationships between at least some nodes of the relevant neighborhood.

8. A non-transitory computer-readable medium bearing computer executable instructions which, when executed on a computing system comprising at least a processor, carry out a method, comprising:

maintaining, in a data store of the computing system, a corpus graph comprising a first plurality of nodes;
conducting a random walk process among the first plurality of nodes originating with target node, the random walk process resulting in a subset of nodes of the first plurality of nodes, wherein each node of the subset of nodes is associated with an importance value to the target node according to a visit count to the respective node during the random walk process;
determining a relevant neighborhood for the target node comprising a second plurality of nodes of the subset of nodes having highest associated importance values;
generating neighborhood embedding information for the target node, the neighborhood embedding information comprising a plurality of embedding elements, each embedding element determined according to an embedding vector of a node of the relevant neighborhood and as a function of the associated importance value of the node to the target node;
storing the neighborhood embedding information in the data store in association with the target node; and
in response to determining that a query corresponds to the target node, providing at least one item of content corresponding to at least one node as responsive to the query, the at least one node determined based at least in part on the neighborhood embedding information.

9. The non-transitory computer-readable medium of claim 8, wherein generating the neighborhood embedding information for the target node comprises:

for each embedding element of the neighborhood embedding information:
selecting a node of the relevant neighborhood; and
selecting an embedding element of an embedding vector of the selected node as a current embedding element of neighborhood embedding information.

10. The non-transitory computer-readable medium of claim 9, wherein selecting a node of the relevant neighborhood comprises selecting a node of the relevant neighborhood according to the importance values of the nodes of the relevant neighborhood.

11. The non-transitory computer-readable medium of claim 8, wherein the relevant neighborhood for the target node includes up to a predetermined number of nodes.

12. The non-transitory computer-readable medium of claim 8, wherein the second plurality of nodes comprises nodes of the subset of nodes having the highest associated importance values greater than a predetermined threshold value.

13. The non-transitory computer-readable medium of claim 8, wherein the method carried out on the computing system further comprises:

combining the embedding values of the neighborhood embedding information with an embedding vector of the target node to form an aggregated embedding vector for the target node; and
storing the aggregated embedding vector in the data store in association with the target node.

14. The non-transitory computer-readable medium of claim 8, wherein the nodes of the relevant neighborhood are further determined, at least in part, according to a frequency of relationships between at least some nodes of the relevant neighborhood.

15. A computer system comprising a processor and a memory, wherein the processor, in executing instructions stored in the memory, causes the computer system to at least:

maintain in a data store a corpus graph comprising a first plurality of nodes;
conduct a random walk process among the first plurality of nodes originating with a target node and resulting in a subset of nodes of the first plurality of nodes, wherein each node of the subset of nodes is associated with an importance value corresponding to the target node based, at least in part, on a visit count to the respective node during the random walk process;
determine a relevant neighborhood for the target node comprising a second plurality of nodes of the subset of nodes having highest associated importance values;
generate neighborhood embedding information for the target node, the neighborhood embedding information comprising a plurality of embedding elements, each embedding element determined according to an embedding vector of a node of the relevant neighborhood and as a function of the associated importance value of the node to the target node;

store the neighborhood embedding information in the data store in association with the target node; and in response to determining that a query corresponds to the target node, provide at least one item of content corresponding to at least one node as responsive to the query, the at least one node determined based at least in part on the neighborhood embedding information.

16. The computer system of claim 15, wherein in generating the neighborhood embedding information for the target node, and for each element of neighborhood embedding information, the computer system:

selects a node of the relevant neighborhood; and selects an embedding element of an embedding vector of the selected node as a current embedding element of the neighborhood embedding information.

17. The computer system of claim 16, wherein execution of the instructions further causes the computer system to select a node of the relevant neighborhood according to the importance values of the nodes of the relevant neighborhood.

18. The computer system of claim 17, wherein the relevant neighborhood for the target node includes up to a predetermined number of nodes.

19. The computer system of claim 18, wherein the second plurality of nodes comprises nodes of the subset of nodes having the highest associated importance values greater than a predetermined threshold value.

20. The computer system of claim 18, wherein execution of the instructions further causes the computer system to at least:

combine the neighborhood embedding information with an embedding vector of the target node to form an aggregated embedding vector for the target node; and store the aggregated embedding vector in the data store in association with the target node.

* * * * *

UNITED STATES PATENT AND TRADEMARK OFFICE
CERTIFICATE OF CORRECTION

| | | |
|---|---|---|
| PATENT NO. | : 11,227,014 B2 | Page 1 of 1 |
| APPLICATION NO. | : 16/273969 | |
| DATED | : January 18, 2022 | |
| INVENTOR(S) | : Jurij Leskovec et al. | |

It is certified that error appears in the above-identified patent and that said Letters Patent is hereby corrected as shown below:

On the Title Page

Item (73) Assignee "Amazon Technologies, Inc., Seattle, WA (US)" should read as, --Pinterest, Inc., San Francisco, CA (US)--.

Signed and Sealed this
Sixth Day of June, 2023

Katherine Kelly Vidal
*Director of the United States Patent and Trademark Office*